US011137766B2

(12) United States Patent
Gier et al.

(10) Patent No.: US 11,137,766 B2
(45) Date of Patent: Oct. 5, 2021

(54) STATE MACHINE FOR TRAVERSING JUNCTIONS

(71) Applicant: Zoox, Inc., Foster City, CA (US)

(72) Inventors: Max Gier, Aachen (GE); Lichao Ma, Santa Clara, CA (US); William Anthony Silva, San Francisco, CA (US)

(73) Assignee: Zoox, Inc., Foster City, CA (US)

( * ) Notice: Subject to any disclaimer, the term of this patent is extended or adjusted under 35 U.S.C. 154(b) by 129 days.

(21) Appl. No.: 16/295,935

(22) Filed: Mar. 7, 2019

(65) Prior Publication Data

US 2020/0285244 A1    Sep. 10, 2020

(51) Int. Cl.

| G05D 1/02 | (2020.01) |
| G06F 9/448 | (2018.01) |
| B60W 30/18 | (2012.01) |
| G05D 1/00 | (2006.01) |

(52) U.S. Cl.
CPC ..... *G05D 1/0223* (2013.01); *B60W 30/18154* (2013.01); *G05D 1/0088* (2013.01); *G05D 1/0221* (2013.01); *G05D 1/0242* (2013.01); *G05D 1/0246* (2013.01); *G06F 9/4498* (2018.02)

(58) Field of Classification Search
CPC ....... B60W 2720/10; B60W 30/18154; B60W 30/18159; B60W 60/0011; B60W 2050/0016; B60W 2552/53; B60W 2555/60; G05D 1/0088; G05D 1/0221; G05D 1/0223; G05D 1/0242; G05D 1/0246; G06F 9/4498

USPC .......................................................... 701/23
See application file for complete search history.

(56) References Cited

U.S. PATENT DOCUMENTS

| 8,712,624 | B1 | 4/2014 | Ferguson et al. | |
| 10,146,223 | B1 * | 12/2018 | Luders | B60W 30/00 |
| 2002/0036584 | A1 * | 3/2002 | Jocoy | G01S 13/931 |
| | | | | 342/70 |
| 2007/0035416 | A1 | 2/2007 | Tanaka et al. | |

(Continued)

FOREIGN PATENT DOCUMENTS

| EP | 3185233 A1 | 6/2017 |
| WO | WO2013186620 | 12/2013 |

(Continued)

OTHER PUBLICATIONS

The PCT Search Report and Written Opinion dated Jun. 9, 2020 for PCT Application No. PCT/US2020/020821, 12 pages.

(Continued)

*Primary Examiner* — Atul Trivedi
(74) *Attorney, Agent, or Firm* — Lee & Hayes, P.C.

(57) ABSTRACT

Techniques are discussed for controlling a vehicle, such as an autonomous vehicle, to navigate a junction in an environment. In some cases, the techniques can be used to navigate a turn at the junction or traverse through the junction. Operations include the vehicle detecting a stop signal and preparing the vehicle to stop at a location associated with the junction. The vehicle can determine a time to execute a maneuver and a visibility distance that a sensor can observe in the environment. A speed of the vehicle to execute the maneuver can be determined based on the time to execute the maneuver and the visibility distance.

20 Claims, 7 Drawing Sheets

(56) References Cited

U.S. PATENT DOCUMENTS

| | | | | |
|---|---|---|---|---|
| 2008/0012726 | A1* | 1/2008 | Publicover | G08G 1/096791 340/932 |
| 2010/0106356 | A1* | 4/2010 | Trepagnier | G08G 1/16 701/25 |
| 2016/0318490 | A1* | 11/2016 | Ben Shalom | B60T 7/18 |
| 2017/0057514 | A1* | 3/2017 | Toyoda | B60W 30/18154 |
| 2017/0113665 | A1* | 4/2017 | Mudalige | G08G 1/166 |
| 2017/0113683 | A1* | 4/2017 | Mudalige | B60W 30/18145 |
| 2017/0193384 | A1* | 7/2017 | Mudalige | G08G 1/166 |
| 2017/0262709 | A1* | 9/2017 | Wellington | G06K 9/6201 |
| 2018/0074502 | A1* | 3/2018 | Holben | B60W 30/18154 |
| 2018/0137762 | A1 | 5/2018 | Lee et al. | |
| 2018/0259957 | A1* | 9/2018 | Charrow | B62D 15/0265 |
| 2018/0284285 | A1* | 10/2018 | Curatu | G01S 7/4816 |
| 2018/0370528 | A1* | 12/2018 | Rittger | B60W 30/0956 |
| 2019/0009782 | A1 | 1/2019 | Kanzawa | |
| 2019/0043353 | A1* | 2/2019 | Kim | G05D 1/0274 |
| 2019/0079523 | A1 | 3/2019 | Zhu | |
| 2019/0347821 | A1* | 11/2019 | Stein | G01C 21/28 |
| 2019/0384294 | A1* | 12/2019 | Shashua | G05D 1/0088 |
| 2019/0384304 | A1* | 12/2019 | Towal | G05D 1/0221 |
| 2020/0019802 | A1* | 1/2020 | Krishnan | G06K 9/6256 |
| 2020/0180612 | A1* | 6/2020 | Finelt | B60W 30/09 |
| 2020/0257317 | A1* | 8/2020 | Musk | G05D 1/12 |
| 2020/0346662 | A1 | 11/2020 | Suzuki et al. | |
| 2021/0016777 | A1* | 1/2021 | Weiser | G08G 1/097 |
| 2021/0129834 | A1 | 5/2021 | Gier | |
| 2021/0133466 | A1 | 5/2021 | Gier | |

FOREIGN PATENT DOCUMENTS

| | | |
|---|---|---|
| WO | WO2016094088 | 6/2016 |
| WO | WO2016094224 | 6/2016 |
| WO | WO2019093190 A1 | 5/2019 |

OTHER PUBLICATIONS

Bouraine et al., "Passively Safe Partial Motion Planning for Mobile Robots", 2014 IEEE International Conference on Robotics and Automationc (ICRA), May 31-Jun. 7, 2017, pp. 3576-3582.

Bouton et al., "Belief State Planning for Autonomously Navigating Urban Intersections", 2017 IEEE Intelligent Vehicles Symposium (IV), Los Angeles, CA, USA, 2017, pp. 825-830.

Bouton et al., "Scalable Decision Making with Sensor Occlusions", 2018 IEEE International Conference on Robotics and Automation, May 21-25, 2018, pp. 2076-2081.

Brechtel et al, "Probabilistic Decision-Making under Uncertainty for Autonomous Driving using Continuous POMDPs", 2014 IEEE 17th International Conference on Intelligent Transportation Systems, Oct. 8-11, 2014, pp. 392-399.

Campbell et al., "Autonomous Driving in Urban Environments", Philosophical Transaction of The Royal Society, Philosophical Transactions, 2010, pp. 4649-4672.

Chong et al., "Autonomous Robot Driving Decision Strategy Following Road Signs and Traffic Rules", 2016 16th International Conference on Control, Automation and Systems (ICCAS 2016), Oct. 16-19, 2016, pp. 377-381.

Chung et al., "Safe Navigation of a Mobile Robot Considering Visibility of Environment", IEEE Transactions on Industrial Electronics, vol. 56, No. 10, Oct. 2009, pp. 3941-3950.

Cohenet al., "Symmetry-aware Facade Parsing with Occlusions", Microsoft USA, pp. 1-9.

General Motors, 2018 Self-Driving Safety Report, 2018, pp. 1-33.

Gu et al., "A Motion Planning Algorithm Based on Uncertainty Prediction", 2013 International Conference on InformationScience and Cloud Computing, pp. 1-6.

Guan et al., "Real-time Event-Triggered Object Tracking in the Presence of Model Drift and Occlusion", IEEE Transactions on Industrial Electronics, vol. 66, No. 3, Mar. 2019, pp. 2054-2065.

Henriques et al., "High-Speed Tracking with Kernelized Correlation Filters", IEEE Transactions on Pattern Analysis and Machine Intelligence, vol. 37, No. 3, Mar. 2015, pp. 583-596.

Here, "HD Live Map Automotive Developer Guide", 2017, pp. 1-125.

Hoermann et al., "Entering Crossroads with Blind Corners", 2017 IEEE Intelligent Vehicles Symposium, Jun. 11-14, 2017, Redondo Beach, CA, pp. 727-732.

Hsiao et al., "Occlusion Reasoning for Object Detection under Arbitrary Viewpoint", IEEE Transactions on Pattern Analysis and Michine Intelligence, vol. 36, No. 9, Sep. 2014, pp. 1803-1815.

Kim et al., "Object Bounding Box-Critic NEetworks for Occlusion-Robust Object Detection in Road Scene", IEEE 2018 ICIP, pp. 1313-1317.

Lee et al., "Collision Risk Assessment for Possible Collision Vehicle in Occluded Area Based on Precise Map", 2017 IEEE International Conference on Intelligent Transportation System, pp. 1-6.

Leng et al., "Real-Time RGB-D Visual Tracking with schale Estimation and Occlusion Handling", IEEE Access, vol. 6 2018, pp. 24256-24263.

Levinson et al., "Towards Fully Autonomous Driving Systems and Algorithms", 2011 IEEE Intelligent Vehicles Symposium(IV), Baden-Baden, Germany, Jun. 5-9, 20177, pp. 163-168.

Li et al., "Real-Time Trajectory Planning for Autonomous", IEEE/ASME Transactions on Mechatronics, vol. 21, No. 2, Apr. 2019, pp. 740-753.

Li et al., "Trajectory Planning for Autonomous Ground Vehicles Driving in Structured", 2017 9th International Conference on Intelligenct Human-Machine Systems and Cybernectics, IEEE 2017, pp. 41-46.

Lim et al., "Hierarchical Trajectory Planning of an Autonomous", IEEE Transactions on Intelligent Transportation Systems, vol. 19, No. 2, Feb. 2018, pp. 613-626.

Ma et al., "A Two-level Path Planning Method for On-road Autonomous Driving", 2012 International Conference on Intelligent Systems Designs and Engineering Application, pp. 661-664.

Ma et al., "Efficient Sampling-Based Motion Planning for On-Road Autonomous Driving", IEEE Transactions on Intelligent Transportation Systems, vol. 16, No. 4, Aug. 2015, pp. 1961-1976.

Miller et al., "Team Cornell's Skynet Robust Perception and Planning in Urban Environment", Journal of Field Robotics, 2008, vol. 25, No. 8, pp. 493-527.

Noh, "Decision-Making Framework for Autonomous Driving at Intersections: Safeguarding Against Collision, Overly Conservative Behavior, and Violation Vehicles", IEEE Transactions on Industrial Electronics, vol. 66, No. 4, Apr. 2019, pp. 3275-3286.

Orzechowski et al., "Tackling Occlusions & Limited Sensor Range with Set-based Safety Verification", 2018, pp. 1-8.

Paden et al., "A Survery of Motion Planning and Control Techniques for Self-Driving Urban Vechicles", Apr. 25, 2016, Laboratory for Information and Decision Systems, Massachusetts Institute of Technology, pp. 1-27.

Pan et al., "Robust and Accurate Object Tracking Under Various Types of Occlusions", IEEE Transactions on Circuits and Systems for Video Technology, vol. 18, No. 2, Feb. 2008, pp. 223-236.

Pendleton et al., "Perception, Planning, Control and Coordination, for Autonomous Vehicles", MDPI, Machines 2017, 5, 6, pp. 1-54.

Sadou et al., "Occlusions in Obstacle Detection for Safe Navigation", 2004 IEEE Intelligent Vehicles Symposium, University of Parma, Jun. 14-17, 2004, pp. 716-721.

Seo et al., "A Perception Mechanism for Supporting Autonomous Intersection Handling in Urban Driving", 2008 IEEE/RSJ International Conference on Intelligent Robot and Systems, Sep. 22-26, 2008, pp. 1830-1835.

Shang et al., "Improving Pedestrian Detection in Crowds with Synthetic Occlusion Images", 2018 IEEE, Tsinghuw National Lab for Info. Sci. & Tech., pp. 1-4.

Song et al., "Intention-aware Decision Making in Urban Lane", 2018 IEEE International Conference on Vehicular Electronics and Safety (ICVES), Sep. 12-14, 2018, pp. 1-8.

Song et al., "Learning a Deep Motion Planning Model for Autonomous Driving", 2018 IEEE Intelligent Vehicles Symposium, Jun. 26-30, 2018, pp. 1137-1142.

(56) References Cited

OTHER PUBLICATIONS

Sonu et al., "Exploiting Hierarchy for Scalable Decision", 2018 IEEE Intelligent Vehicles Symposium, Jun. 26-30, 2018, pp. 2203-2208.
Sun et al., "Trajectory Planning for Vehicle Autonomous Driving with Uncertainties", 2014 International Conference on Informative and Cybernetics for Computational Social Systems (ICCSS), pp. 34-38.
Waymo, "Waymo Safety Report", 2018, pp. 1-43.
Wei et al., "A Prediction- and Cost Function-Based Algorithm for Robust Autonomous Freeway Driving", 2010 IEEE Intelligent Vehicles Symposium, Univeristy of California, San Diego, CA, Jun. 21-24, 2010, pp. 513-517.
Zhan et al., "A Non-Conservatively Defensive Strategy for Urban Autonomous Driving", 2016 IEEE 19th International Conference on Intelligent Transporation Systems, Nov. 1-4, 2016, pp. 459-464.
Zhang, Dynamic Trajectory Planning for Vehicle Autonomous Driving, 2013 IEEE International Conference on Systems, Man, and Cybernectics, pp. 4161-4166.
PCT Search Report and Written Opinion dated Feb. 1, 2021 for PCT Application No. PCT/US20/57336, 13 pages.

\* cited by examiner

STATE MACHINE FOR TRAVERSING JUNCTIONS

BACKGROUND

Various methods, apparatuses, and systems are utilized by autonomous vehicles to guide such autonomous vehicles through environments including various static and dynamic objects. For instance, autonomous vehicles utilize route planning methods, apparatuses, and systems to guide autonomous vehicles through congested areas with other moving vehicles (autonomous or otherwise), moving people, stationary buildings, etc. In some examples, an autonomous vehicle may make decisions while traversing an environment to ensure safety for passengers and surrounding persons and objects. An autonomous vehicle may also encounter a variety of traffic controls, such as stop signs, traffic lights, pedestrian crossings, train crossings, and the like, which may affect how the vehicle traverses the environment. Controlling the autonomous vehicle when traffic controls are encountered may present challenges.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

DETAILED DESCRIPTION

Figure 1:
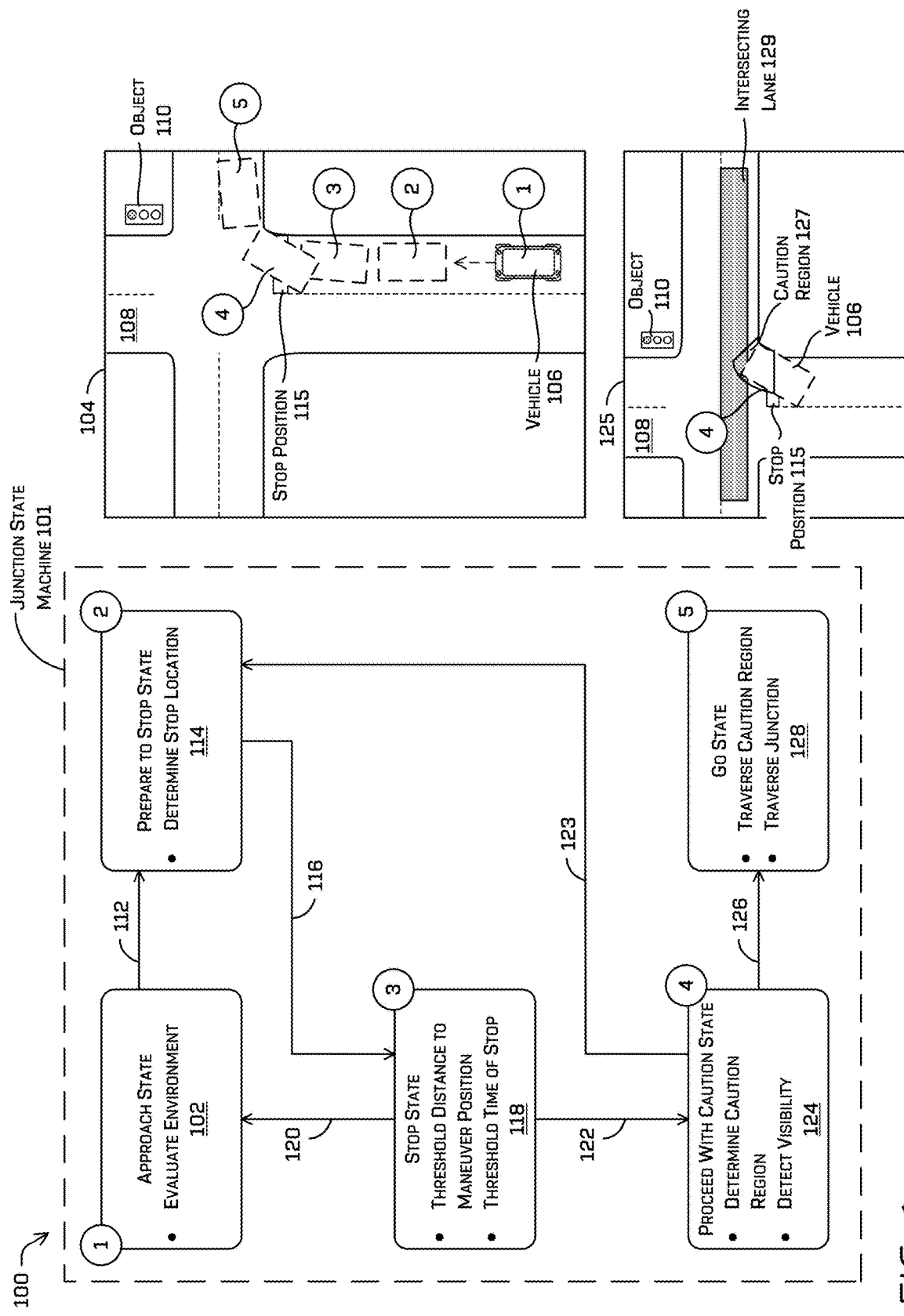
FIG. 1 is a pictorial flow diagram of an example state machine for an autonomous vehicle including an approach state, a prepare to stop state, a stop state, a proceed with caution state, and a go state, in accordance with examples of the disclosure.

This disclosure is directed to a state machine for controlling a vehicle (e.g., an autonomous vehicle) to traverse a junction in an environment, such as to make a right turn when encountering with a red traffic light, both lawfully and safely, as well as functions controlling transitions (and/or executed during transitions) between states therein. In some examples, the state machine may include states such as an approach state, a prepare to stop state, a stop state, a proceed with caution state, and a go state. The vehicle may use a variety of logic to evaluate information received from sensor(s) associated with the vehicle to transition between the various states of the state machine. The state machine described herein may be part of a larger state machine for controlling a vehicle to traverse an environment, including additional/different transitions between states, additional states, transitions to other state machines, and so forth.

Sensor data captured by the vehicle can include lidar data, radar data, image data, time of flight data, sonar data, and the like. In some cases, the sensor data can be provided to a perception system configured to determine a type of an object (e.g., vehicle, pedestrian, bicycle, animal, parked car, tree, building, traffic control, and the like) in the environment.

For instance, the sensor data may be captured by the vehicle as the vehicle traverses an environment. In some examples, the vehicle may be following a route that includes a series of waypoints used to reach a desired destination. In some cases, a junction reasoning component of the vehicle may utilize the sensor data and/or map data to evaluate the surrounding environment. As the vehicle traverses the environment, the vehicle may encounter a traffic control device, such as a traffic light, at which point the vehicle may enter the "approach" state. In the approach state, the junction reasoning component may evaluate the sensor data and map data to make various determinations about the junction. For instance, the approach state may include determining whether the vehicle must stop at the junction (e.g., at a stop sign), whether the vehicle may enter a proceed with caution state directly (e.g., an uncontrolled intersection), whether the vehicle may enter a go state directly (e.g., vehicles approaching the junction from other directions are required to stop), and so forth.

In some examples, the sensors of the vehicle may detect that the junction includes a traffic light, and further determine that the traffic light is currently presenting a "stop" indicator (e.g., a red light). The junction reasoning component may then transition to a "prepare to stop" state of the state machine. In some examples, the junction reasoning component may also transition to the prepare to stop state in response to detection of a yellow light to ensure safety and comply with traffic laws. The prepare to stop state may include setting a stopping sub-goal, which may contain a stop position at which the vehicle should come to a stop. The stop position may be, for example, stop line of the junction, a yielding position of the junction, and so on. However, in some cases, the stop position may not be located at a stop line or yielding position, such as when another vehicle is ahead of the vehicle at the junction, in which case the stop position may be a threshold distance (e.g., 2 meters) behind the other vehicle.

When the vehicle comes to a complete stop, the vehicle enters the "stop" state of the state machine. The junction reasoning component may continue evaluating sensor data to determine whether to exit the stop state. For example, the junction reasoning component may determine, in the stop state, whether the stop position of the vehicle is within a threshold distance of a maneuver position. In at least some examples, the maneuver position may correspond to a location of a drivable region from which the vehicle may safely and lawfully execute the right-on-red maneuver, such as a stop line or a yield position as described in relation to the stop position. However, the maneuver position may not be a threshold distance behind another vehicle as was described in relation to the stop position, as the vehicle cannot lawfully and/or safely execute the right-on-red maneuver if another vehicle is between the vehicle and the junction. In some instances, the vehicle may need to stop before reaching the maneuver position, such as if there are other vehicles in front of the vehicle at the junction. When other vehicles are in front of the vehicle at the junction, the vehicle may not reach the maneuver position before the traffic light changes to green, and therefore the vehicle may remain in the stop state (or alternating between the stop state and the prepare to stop state) without progressing on to the other states of the right-on-red state machine.

The junction reasoning component may also determine, in the stop state, whether the vehicle has been stopped for a threshold amount of time. By waiting a threshold amount of time in the stop position and observing the surrounding environment, the vehicle can increase the likelihood of safely traversing the junction. The threshold amount of time may be a predetermined amount of time (e.g., 0.5 seconds, 1 second, 5 seconds, 8 seconds, 10 seconds, etc.), and/or may be based on conditions of the junction, such as an amount of time an oncoming vehicle may take to traverse the junction based on a speed limit of the junction.

If the vehicle is stopped within a threshold distance of the maneuver position, and has been stopped for the threshold amount of time, the junction reasoning component may control the vehicle to enter a "proceed with caution" state of the state machine. The proceed with caution state controls the vehicle to continue moving through a caution region along the route at a speed that allows the vehicle to yield (e.g., stop, slow down, etc.) to oncoming vehicles. This speed is referred to herein as a "transition speed." The transition speed may range from completely stopped to a speed limit associated with the junction (linearly, non-linearly, etc.). The caution region provides a distance between a body of the vehicle and other vehicles entering the junction (e.g., having the right-of-way at the junction), such that the vehicle does not influence the paths of the other vehicles.

The junction reasoning component may determine a transition speed based on circumstances of the particular junction at the particular time that the vehicle encounters the junction, e.g., on-the-fly. In some examples, a size of the caution region through which the transition speed will be used may be determined based on an arc length beginning at a defined parallel offset of the desired lane into which the vehicle is to merge, to the intersection line of the lane with the arc. In other words, the arc length coordinates with the projected path of travel from the stop position to within the desired lane. The junction reasoning component may also use the arc length to determine a time to execute the maneuver, taking into consideration accelerating from stop to reaching a desired speed (e.g., the speed limit of the junction). The time determined to execute the maneuver may then be combined with the speed limit of the junction to determine an amount of desired visible distance that the vehicle can sense before executing the maneuver. For example, if the vehicle is presented with a junction having a fast speed limit for oncoming vehicles, the vehicle may need a greater visibility distance before executing the maneuver, while a slow speed limit for oncoming vehicles may require less visibility distance before executing the maneuver. In some cases, insufficient visibility distance may prevent the vehicle from performing the maneuver, e.g., prevent the vehicle from turning right on red.

The junction reasoning component may use the information generated in the proceed with caution state to then determine the transition speed. In a first example scenario, if the time to execute the maneuver is low, and the observed visibility distance is high, the transition speed may be increased to approach the speed limit of the junction by the end of the maneuver. However, in a second example scenario, if the time to execute the maneuver is high and the observed visibility distance is low, the transition speed may be lowered to give the vehicle additional time to detect oncoming vehicles at the junction, and yield to these vehicles.

The junction reasoning component uses the determined transition speed to control the vehicle to proceed through the caution region in the proceed with caution state while continuously evaluating sensor data of the surrounding environment throughout the caution region. If an oncoming vehicle is detected while the vehicle is in the caution region, the junction reasoning component may control the vehicle to yield to the oncoming vehicle, and then continue through the caution region. However, if the vehicle passes a threshold point of the caution region and/or the junction itself, the junction reasoning component may control the vehicle to enter a "go" state of the state machine. In some examples, the go state may not have any outgoing transitions within the state machine, e.g., the vehicle is not able to reenter the prepare to stop state, the stop state, and/or the proceed with caution state associated with a right turn on red, although the vehicle may enter other states for additional state machines. Reentering the previous states from the go state may cause safety concerns, as the vehicle has entered an intersecting path of oncoming vehicles, and therefore it may be safer to proceed along the route than slowing or stopping in the (potential) intersection path. In at least some examples, multiple caution regions may be present to cross a particular junction. As a non-limiting example, a caution region may be associated with each lane, each maneuver, or the like. Caution regions can be cleared in an order that the vehicle approaches the respective caution regions, and based at least in part on visibility (free of occlusions or a determination that it is safe to proceed), a vehicle state (speed, position, acceleration, etc.), and/or other determinations about the environment through which the vehicle is passing in addition to the vehicle state.

The techniques discussed herein can improve a functioning of a computing device in a number of ways. As mentioned above, the junction reasoning system may use determinations made about the particular junction at the particular time of the encounter to safely and efficiently make right-hand turns on red lights, though any other maneuver is contemplated. Consequently, the vehicle may traverse routes both faster and safer than techniques that require all regions to be visible and evaluated or do not permit right turns on red lights at all, thus saving processing and computing resources in analyzing the surrounding environment. In some cases, the dynamic nature of the described techniques (e.g., controlling the vehicle based in part on caution regions and real-time visibility) require fewer rules to be enumerated for generating and/or selecting trajectories for vehicles such as autonomous vehicles to traverse an environment. By controlling the vehicle based in part on caution regions and real-time visibility, the safety of the vehicle can be improved by allowing the vehicle to adapt and react to its surroundings, rather than requiring the vehicle to follow set instructions, especially when a situation arises in which there is not a specific rule present. Further, controlling the vehicle based in part on caution regions and real-time visibility within the context of a state machine having a reduced number of rules can reduce processing resources, as fewer scenarios are evaluated by the processing resources at one time during the junction encounter. Further, techniques for controlling the vehicle based in part on caution regions and real-time visibility within the context of a state machine can increase a confidence that the vehicle can avoid collisions with oncoming traffic in a right-on-red encounter, which may improve safety outcomes, performance, and/or accuracy. These and other improvements to the functioning of the computer are discussed herein.

The techniques described herein can be implemented in a number of ways. Example implementations are provided below with reference to the following figures. Although discussed in the context of an autonomous vehicle, the methods, apparatuses, and systems described herein can be applied to a variety of systems (e.g., a sensor system or a robotic platform), and is not limited to autonomous vehicles. In one example, similar techniques may be utilized in driver-controlled vehicles in which such a system may provide an indication to a driver of the vehicle of whether it is safe to perform various maneuvers. In another example, the techniques can be utilized in an aviation or nautical context, or in any system involving objects or entity that may be associated with behavior that is unknown to the system. Additionally, the techniques described herein can be used with real data (e.g., captured using sensor(s)), simulated data (e.g., generated by a simulator), or any combination of the two.

FIG. 1 is a pictorial flow diagram 100 of an example junction state machine 101 for an autonomous vehicle including an approach state, a prepare to stop state, a stop state, a proceed with caution state, and a go state, in accordance with examples of the disclosure. Of course, such states and connections therebetween are depicted for illustrative purposes only and other state machines are contemplated which comprise greater or fewer states and/or differing connections therebetween. In at least some examples, different state machines may be used for different scenarios and/or maneuvers.

The junction state machine 101 can include an approach state 102. In some examples, the approach state 102 can include evaluating an environment (e.g., by analyzing data collected by one or more sensors) for a variety of objects that may trigger a vehicle to take a particular action. An example 104 illustrates an environment that includes a vehicle 106 traversing on a drivable surface 108 and approaching an object 110. For the purpose of discussion, the vehicle 106 capturing (or utilizing) the sensor data can be an autonomous vehicle configured to operate according to a Level 5 classification issued by the U.S. National Highway Traffic Safety Administration, which describes a vehicle capable of performing all safety critical functions for the entire trip, with the driver (or occupant) not being expected to control the vehicle at any time. In such an example, since the vehicle 106 can be configured to control all functions from start to stop, including all parking functions, it can be unoccupied. This is merely an example, and the systems and methods described herein can be incorporated into any ground-borne, airborne, or waterborne vehicle, including those ranging from vehicles that need to be manually controlled by a driver at all times, to those that are partially or fully autonomously controlled. Additional details associated with the vehicle 106 are described throughout this disclosure.

The object 110 in this example 104 is a traffic light displaying a "stop" signal. The approach state 102 is denoted with a "1" which is also included in the example 104, where the vehicle 106 may be in the approach state. In some instances, sensor data may be captured by the vehicle 106 during the approach state 102, which can be used to determine information about the object 110, including but not limited to, a type of the object (e.g., semantic information indicating a classification of the object, such as a vehicle, pedestrian, bicycle, animal, and the like). In some instances, operations of the junction state machine 101 can include determining the type of the object 110, a bounding box associated with the object 110, segmentation information associated with the object 110, and/or movement information associated with the object 110, and any uncertainties associated therewith, as discussed herein. The approach state 102 can additionally include accessing map data representing the environment.

For instance, while the vehicle 106 is in the approach state 102, a junction reasoning component of the vehicle 106 may determine, such as by evaluating map data of the environment, that the vehicle 106 is approaching a junction of the drivable surface 108. In at least some examples, the vehicle 106 may determine that such a junction is a controlled junction (i.e., controlled by traffic lights or the like). In some examples, the vehicle 106 may also detect the object 110 in the approach state 102, via sensors associated with the vehicle 106, and that the object 110 is displaying a "stop" signal (e.g., a red light). Although not explicitly pictured, it should be understood that the vehicle 106 may also detect that the object 110 is displaying a "go" signal (e.g., a green light) and control the vehicle 106 accordingly, that the object 110 is displaying a signal to cross only if unable to stop safely (e.g., a yellow light) and control the vehicle accordingly, and so forth.

In response to detecting the stop signal displayed by the object 110, the junction reasoning component of the vehicle 106 may perform a transition 112 from the approach state 102 to a prepare to stop state 114. In cases where the object 110 is displaying a different signal, such as a "go" signal, the junction reasoning system may not transition from the approach state 102 to the prepare to stop state 114, but may rather control the vehicle 106 to perform actions according to other systems and/or state machines of the vehicle 106. When the object 110 is determined to be displaying a "go" signal, the junction reasoning component may transition directly to a go state (e.g., go state 128), although a transition between the prepare to stop state 114 and the go state 128 is not pictured for clarity. The prepare to stop state 114 is denoted with a "2" which is also included in the example 104, in which a representation of the vehicle 106 is closer to the junction of the drivable surface 108 than when the vehicle 106 was in the approach state 102.

The prepare to stop state 114 may include determining a stop position 115 where the vehicle 106 should come to a stop. In some examples, one or more other vehicles or objects may be ahead of the vehicle 106 approaching the junction, which may be identified by sensors of the vehicle 106. If there are vehicles between the vehicle 106 and the junction, the junction reasoning system may assign a stop position to a threshold distance behind another vehicle that is in front of the vehicle 106. If there are no other vehicles or objects between the vehicle 106 and the junction, however, the vehicle 106 may assign the stop position 115 relative to a stop line associated with the junction, a defined yielding position associated with the junction (e.g., a distance from the intersecting lane of traffic), a crosswalk associated with the junction, and so forth. Once the stop position 115 is determined, the junction reasoning component may control the vehicle 106 to stop at the stop position 115, and in doing so may perform a transition 116 from the prepare to stop state 114 to a stop state 118 when the vehicle 106 is completely stopped. The stop state 118 is denoted with a "3" which is also included in the example 104, in which a representation of the vehicle 106 is located in a stop position 115 associated with a stop line of the junction.

While in the stop state 118, the junction reasoning system of the vehicle 106 may determine whether the vehicle 106 is within a threshold distance of a maneuver position, corresponding to a right-turn-on-red maneuver, if such an action is desired. As described above, in some cases, the example 104 may include other vehicles or objects between the vehicle 106 and the junction, which may prevent the vehicle 106 from making a right turn at the junction. The junction reasoning system of the vehicle 106 may compare a current position of the vehicle 106 in the stop state 118 to a position suitable for making a right-hand turn at the junction ("maneuver position"), such as at a stop line for the intersection. If the vehicle 106 is greater than a threshold distance from the maneuver position (e.g., 0.5 meters, 1 meter, 2 meters, etc.) and the other vehicles or objects continue to prevent the vehicle 106 from reaching the maneuver position, the vehicle 106 may remain in the stop state 118 (e.g., until the signal displayed by the object 110 changes from "stop" to "go"). If the vehicle 106 is greater than a threshold distance from the maneuver position, and the other vehicles or objects move to allow the vehicle 106 to proceed forward, the junction reasoning component may perform a transition 120 from the stop state 118 to the approach state 102. By transitioning from the stop state 118 back to the approach state 102, the junction reasoning system of the vehicle 106 may determine whether the signal displayed by the object 110 changes from "stop" to "go," whether the other vehicle(s) preventing the vehicle 106 from reaching the maneuver position made a right-hand turn on red, and so on. If the vehicles or objects preventing the vehicle 106 from reaching the maneuver position move to allow the vehicle 106 to reach the maneuver position while the object 110 is still displaying a stop signal, the junction reasoning system may again transition to the prepare to stop state 114 and the stop state 118 as previously described.

In some examples, the junction reasoning system of the vehicle 106 may determine that the current stop position 115 where the vehicle 106 is stopped is within a threshold distance of the maneuver position associated with the junction from which the vehicle 106 may perform a right turn on red. If so, the junction reasoning system may then determine whether the vehicle 106 has been stopped in the stop state 118 for a threshold amount of time (e.g., 0.5 seconds, 1 second, 3 seconds, 5 seconds, 8 seconds, 10 seconds, etc.). In some examples, a threshold time of 8 seconds is used as the threshold time for being in the stop state 118 within the threshold distance of the maneuver position. By waiting the threshold amount of time before transitioning out of the stop state 118, the vehicle 106 accounts for "fresh" red lights, where other vehicles in the intersecting lane of traffic may still be clearing the junction, thus providing an additional safety measure before continuing through the junction. The stop state 118 may also include collecting and analyzing data collected by sensors of the vehicle 106 for any additional oncoming traffic in the intersecting lane(s) that the vehicle 106 should yield to at the junction as a result of the stop signal presented by the object 110.

If the conditions of the stop state 118 are met, the junction reasoning component may perform a transition 122 from the stop state 118 to a proceed with caution state 124. The proceed with caution state 124 is denoted with a "4" which is also included in the example 104, in which a representation of the vehicle 106 has begun to turn right at the junction.

Additionally, an example 125 includes the vehicle 106 and depicts additional details of the proceed with caution state 124, denoted also with a "4." In the proceed with caution state 124, the vehicle 106 begins to creep into a "caution region" 127 of the junction. The caution region 127 may provide the vehicle 106 with enough distance between a body of the vehicle 106 and other vehicles in an intersecting lane(s) 129 of the junction that if the vehicle 106 were to stop in the caution region 127, the other vehicles would be able to safely avoid a collision with the vehicle 106. When approaching the caution region of the junction, the vehicle 106 may proceed from the stop of the stop state 118 at a transition speed that is dependent upon an amount of visibility of the junction and a distance to the caution region. For example, further distance from the caution region and more visibility may result in a faster transition speed to approach the caution region, while shorter distance to the caution region and less visibility may result in a slower transition speed to approach the caution region.

To determine a size and/or dimension of the caution region 127, the junction reasoning system of the vehicle 106 may take into account the geometry of the particular junction at which the vehicle 106 has stopped, in addition to other factors to perform the maneuver. First, the junction reasoning system may determine a desired parallel offset from the desired merge lane (e.g., the intersecting lane 129) once the right-on-red maneuver is executed. Although generally described herein as "parallel," the offset region may in some cases not be parallel to the desired merge lane, but instead may identify a reference line, region, or area some distance away from a reference line or area, where the offset may vary along the reference line, region, or area. The parallel offset, in some examples, may be 2.5 meters from the desired merge lane, although any suitable distance may be used for a parallel offset. Once the parallel offset is determined, the junction reasoning system may determine an arc length from an intersection of the vehicle 106 (and/or an intersection of a projected trajectory of the vehicle 106) with the parallel offset, to an intersection line of the desired merge lane with the arc. Therefore, the arc length corresponds to a projected path of travel of the vehicle 106 from the stop position 115 to being merged into the desired lane. The arc length defines the caution region for the vehicle 106 in making the right-turn-on-red maneuver. Additional details regarding how the arc length is determined, and how the parallel offset is determined, are discussed in relation to FIG. 3.

The junction reasoning component may also use the arc length to determine a time to execute the maneuver, taking into consideration accelerating from stop (or the transition speed at which the vehicle is approaching the caution region) to reaching a desired speed (e.g., the speed limit of the junction). The time determined to execute the maneuver may then be combined with the speed limit of the intersecting lane(s) 129 of the junction to determine an amount of desired visible distance that the vehicle can sense before executing the maneuver. The junction reasoning component may detect visibility of the intersecting lane(s) 129 by evaluating sensor data from sensors of the vehicle 106, and determine whether there is sufficient visibility to perform the right-on-red maneuver.

The junction reasoning component may use the information generated in the proceed with caution state 124 to then determine a transition speed to traverse the caution region. Several factors may contribute to determining a transition speed, such as an amount of determined visibility (e.g., more visibility weighs in favor of higher transition speed while lower visibility weighs in favor of lower transition speed), an estimated time to execute the right-on-red maneuver (e.g., a longer execution time weighs in favor of lower transition speed while a shorter execution time weighs in favor of higher transition speed), and so on. The junction reasoning component may use the determined transition speed to control the vehicle 106 to proceed through the caution region 127 in the proceed with caution state 124, continuing to evaluate sensor data of the surrounding environment throughout the caution region 127.

If an oncoming vehicle is detected while the vehicle 106 is in the caution region 127, the junction reasoning component may control the vehicle 106 to yield to the oncoming vehicle by performing a transition 123 from the proceed with caution state 124 back to the prepare to stop state 114. Once the vehicle 106 has yielded to the oncoming vehicle, the junction reasoning component may control the vehicle 106 to continue through the caution region 127 at the transition speed (which may not be constant throughout the maneuver). However, if the vehicle 106 passes a threshold point of the caution region 127 and/or the junction itself, the junction reasoning component may control the vehicle 106 to perform a transition 126 from the proceed with caution state 124 to a go state 128. The go state 128 is denoted with a "5" which is also included in the example 104, in which a representation of the vehicle 106 has completed the right-hand turn at the junction and has entered the intersecting lane.

Additional details of state machines for right turns on red, caution regions, and transition speeds are discussed throughout this disclosure.

Figure 2:
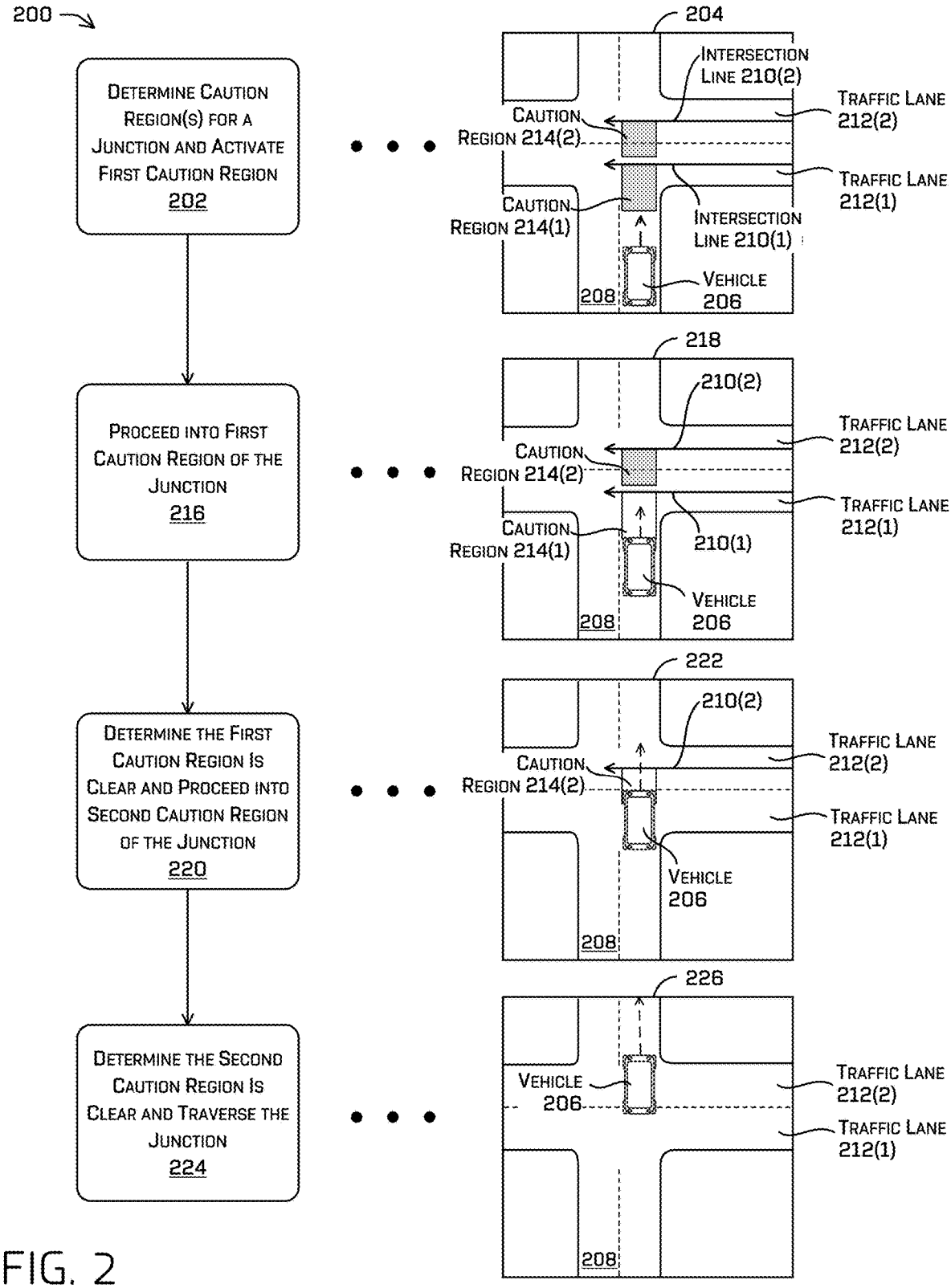
FIG. 2 is a pictorial flow diagram including determining caution regions for a junction, proceeding into the caution regions, determining that the caution regions are clear, and traversing the junction, in accordance with examples of the disclosure.

FIG. 2 is a pictorial flow diagram of a process 200 including determining caution regions for a junction, proceeding into the caution regions, determining that the caution regions are clear, and traversing the junction, in accordance with examples of the disclosure.

An operation 202 includes determining caution region(s) for a junction and activating a first caution region. In some examples, a caution region is defined by a distance to an intersection line, where the intersection line may be derived from map data and represents a point at which a vehicle in a first lane will collide with another vehicle in a second, intersecting lane within the junction. For example, an environment 204 includes a vehicle 206 (e.g., an autonomous vehicle) that is moving along a lane of a drivable region 208 towards intersecting lanes at a junction. The vehicle 206 may determine a first intersection line 210(1) associated with a first intersecting traffic lane 212(1), and a second intersection line 210(2) associated with a second intersecting traffic lane 212(2) at the junction.

The first intersection line 210(1) and/or the second intersection line 210(2) may be determined by accessing map data of the drivable region 208, by accessing sensor data of the drivable region 208 to derive lanes and locations within lanes where vehicles may appear, and so forth. The first intersection line 210(1) represents a point at which the vehicle 206 would collide with another vehicle approaching from the traffic lane 212(1) of the drivable region 208 if the vehicle 206 continued along its trajectory through the traffic lane 212(1) of the junction. Likewise, the second intersection line 210(2) represents a point at which the vehicle 206 would collide with another vehicle approaching from the traffic lane 212(2) of the drivable region 208 if the vehicle 206 continued along its trajectory through the traffic lane 212(1) and through the traffic lane 212(2) of the junction.

The operation 202 may also include determining a first caution region 214(1) corresponding to the first intersection line 210(1) and a second caution region 214(2) corresponding to the second intersection line 210(2). The caution regions 214(1) and 214(2) have an edge furthest from the vehicle 206 that is proximate the intersection lines 210(1) and 210(2), respectively. The vehicle 206 may be approaching the junction at a first transition speed during the operation 202, where the first transition speed is dependent upon an amount of visibility surrounding the drivable region 208 and a distance from the first caution region 214(1). In some examples, the vehicle 206 may decrease the first transition speed as the vehicle gets closer to the first caution region 214(1), and may even come to a stop before traversing the first caution region 214(1) if there is not sufficient visibility to safely traverse the first caution region 214(1). Additionally, the first caution region 214(1) may extend beyond a boundary of the traffic lane 212(1) closest to the vehicle 206, allowing the vehicle 206 to begin yielding behavior before entering the traffic lane 212(1), should another vehicle approach in the traffic lane 212(1).

In some examples, the multiple caution regions 214(1) and 214(2) are determined prior to the vehicle 206 entering the junction (or the first caution region 214(1)), thus allowing the vehicle 206 to control different transition speeds according to changing conditions as the vehicle 206 traverses the junction. The caution regions 214(1) and 214(2) are depicted in the process 200 for the vehicle 206 traversing a junction in a straight direction, and consequently have a generally rectangular geometry. Details regarding determining a geometry for a caution region when a vehicle is executing a turn at a junction are discussed in more detail with respect to FIG. 3. However, the techniques described in the process 200 for activating and clearing caution regions may be applied regardless of the geometry of a caution region.

In some examples, the operation 202 may also include activating the first caution region 214(1). Activating the first caution region 214(1) may include reducing the speed of the vehicle 206 to the first transition speed before the vehicle 206 enters the first caution region 214(1) to determine if any vehicles are approaching from the traffic lane 212(1). If the vehicle 206 determines that no vehicles are approaching the junction via the traffic lane 212(1) that the vehicle 206 must yield to, the vehicle 206 may begin creeping into the activated first caution region 214(1). Activating the first caution region 214(1) may also include determining a second transition speed at which the vehicle 206 may enter the first caution region 214(1), such as based on an amount and/or a distance of visibility to sensors of the vehicle 206.

An operation 216 includes proceeding into the first caution region of the junction. In some examples, proceeding into the first caution region of the junction may be performed at the second transition speed that is based at least in part on an amount of visibility and/or a distance of visibility to sensors of a vehicle. The amount of visibility may correspond to how much of an environment, and in some cases how much of an intersecting traffic lane of a junction, are visible or occluded to sensors of a vehicle. In some examples, proceeding into the first caution region may be dependent upon a threshold portion of an occlusion grid associated with the junction being unoccupied. For example, the vehicle may calculate a visibility score associated with an amount and/or an importance of a visible area of an environment, and make decisions based on the visibility score, such as whether the visibility score. Additional details regarding occlusion grids and determining occupied/unoccupied regions within an occlusion grid may be found in U.S. patent application Ser. No. 16/011,436 titled "Occlusion Aware Planning" and filed Jun. 18, 2018, which is incorporated by reference herein in its entirety. As the vehicle proceeds through the first caution region, the second transition speed may change, depending on whether another vehicle is detected that the vehicle should yield to, whether an amount of visibility increases or decreases, how far the vehicle has proceeded through the caution region, etc.

As stated elsewhere herein, a transition speed may be based on an amount of visibility (or visibility distance) and a distance of the vehicle from a caution region. In some examples, parameters for visibility and distance from a caution region can be normalized so both values are within a range of 0 to 1. The distance from the caution region may be normalized by dividing the distance by a normalization factor of 1.5 meters (although other distances may be used, e.g., 1 meter, 2 meters, 3 meters, etc.). The normalization factor may correspond to a distance to the caution region where the transition speed is the highest while still allowing sufficient distance for a safe stop by the vehicle if another vehicle or entity appears. The normalization factor may decrease linearly as the vehicle approaches the caution region, and may reach a value of 0 when entering the caution region.

The visibility distance relative to a region occluded to sensors of the vehicle may increase or decrease the transition speed as well. For instance, a minimum required visible distance to execute a maneuver (e.g., crossing a lane, turning at a junction, etc.) may be divided by the actual visible distance between a sensor of the vehicle and an occluded region to be normalized to a value between 0 and 1. Combining these normalized values into a factor, the transition speed may be determined using the following:

$$\text{Transition}_{speed} = \text{slow}_{transition} + (\text{fast}_{transition} - \text{slow}_{transition}) * \text{factor} \quad (1)$$

In the equation above, the $\text{slow}_{transition}$ and $\text{fast}_{transition}$ may correspond to a minimum speed and maximum speed, respectively, to execute a maneuver safely and lawfully by a vehicle. In at least some examples, the factor may be determined as the ratio of the visible distance to the distance of the entire occlusion region, $k_{visible} = d_{visible}/d_{occlusion\_region}$. In some examples, a constant $k_{distance}$ may be calculated as:

$$k_{visible} = \begin{cases} 0, & d \leq 0 \\ \dfrac{d}{1.5 \text{ m}}, & 0 < d \leq 1.5 \text{ m}, \\ 1, & d > 1.5 \text{ m} \end{cases} \quad (2)$$

where "d" is the distance to the next caution region. In such examples, the factor may be determined as:

$$\text{factor} = \begin{cases} k_{distance} + k_{visible}, & k_{distance} + k_{visible} < 1 \\ 1, & \text{otherwise} \end{cases} \quad (3)$$

For example, an environment 218 includes the vehicle 206 that has moved into the first caution region 214(1) on the drivable region 208. Although the vehicle 206 has not yet entered the traffic lane 212(1), the vehicle 206 may be performing analysis of sensor data from sensors of the vehicle 206 regarding whether other vehicles are approaching in the traffic lane 212(1), which may be used to determine whether the vehicle 206 should stop before entering the traffic lane 212(1). In some examples, as the vehicle 206 proceeds through the first caution region 214(1), the transition speed of the vehicle 206 may increase based on an increased visibility of the traffic lane 212(1), and a detection that no other vehicles are approaching the junction in the traffic lane 212(1) that the vehicle 206 is obliged to yield to. Additionally, the vehicle 206 may be analyzing sensor data corresponding to the traffic lane 212(2) while in the first caution region 214(1), to determine an appropriate transition speed to enter the second caution region 214(2) such as based on visibility of the traffic lane 212(2).

An operation 220 includes determining that the first caution region is clear and proceeding into a second caution region of the junction. Determining that the first caution region is clear may be based on the vehicle crossing a threshold amount of the intersecting lane, e.g., by a front of the vehicle reaching the intersection line associated with the lane, although other thresholds are also considered. Once the vehicle has reached or crossed the threshold associated with the intersecting lane, the vehicle may be controlled to continue through the lane regardless of whether another vehicle is approaching in the intersecting lane that the vehicle would otherwise be obliged to yield to. This is because a collision between the vehicles would be more likely if the vehicle were to stop in the middle of the intersecting lane than if the vehicle exited the intersecting lane rapidly as the other vehicle approached.

For instance, an environment 222 includes the vehicle 206 that has moved past the intersection line 210(1) of the traffic lane 212(1), and into the second caution region 214(2). By passing the intersection line 210(1), the vehicle 206 may determine that the second caution region 214(1) is clear, and/or that slowing or stopping at or beyond the intersection line 210(1) would be more dangerous than continuing through the traffic lane 212(1).

Although the environment 222 illustrates the vehicle 206 that has not yet entered the traffic lane 212(2), the vehicle 206 may be performing analysis of sensor data from sensors of the vehicle 206 regarding whether other vehicles are approaching in the traffic lane 212(2), which may be used to determine whether the vehicle 206 should stop and/or slow down before entering the traffic lane 212(2). In some examples, as the vehicle 206 proceeds through the second caution region 214(2), the transition speed of the vehicle 206 may increase based on an increased visibility of the traffic lane 212(2), and a detection that no other vehicles are approaching the junction in the traffic lane 212(2) that the vehicle 206 is obliged to yield to.

An operation 224 includes determining that the second caution region is clear, and traversing the junction by accelerating to a driving speed appropriate for the drivable region 208, such as a speed limit associated with the drivable region. Although two traffic lanes and two corresponding caution regions are described in relation to FIG. 2, it should be realized that the process 200 may be applied to a junction having any number of intersecting lanes, e.g., one lane, three lanes, four lanes, etc., by determining caution regions for respective intersecting lanes and proceeding into and through the caution regions as described. Additionally, caution regions may be determined for multiple intersecting lanes when a vehicle is executing a turn at a junction, such as when the vehicle intends to turn into a lane that is not closest to a current position of the vehicle turning at the junction. Determining that the second caution region is clear may be performed similarly as described above, such as by determining that the vehicle crossing a threshold amount of the intersecting lane. Once the vehicle has reached or crossed the threshold associated with the intersecting lane, the vehicle may be controlled to continue through the lane and the remainder of the junction regardless of whether another vehicle is approaching in the intersecting lane that the vehicle would otherwise be obliged to yield to.

An environment 226 includes the vehicle 206 that has moved past the intersection line 210(2) of the traffic lane 212(2) and is continuing to traverse the remainder of the junction. By passing the intersection line 210(2), the vehicle 206 may determine that the second caution region 214(2) is clear, and/or that slowing or stopping at or beyond the intersection line 210(2) would be more dangerous than continuing through the traffic lane 212(2). In some examples, as the vehicle 206 proceeds through the second caution region 214(2) to exit the junction, the transition speed of the vehicle 206 may increase based on an increased visibility of the traffic lane 212(2), and approach a speed limit (or other determined maximum speed for the environment), and continue along a route for the vehicle 206.

Additional details directed to determining caution regions and transition speeds for turns are discussed below in connection with FIGS. 3 and 4.

Figure 3:
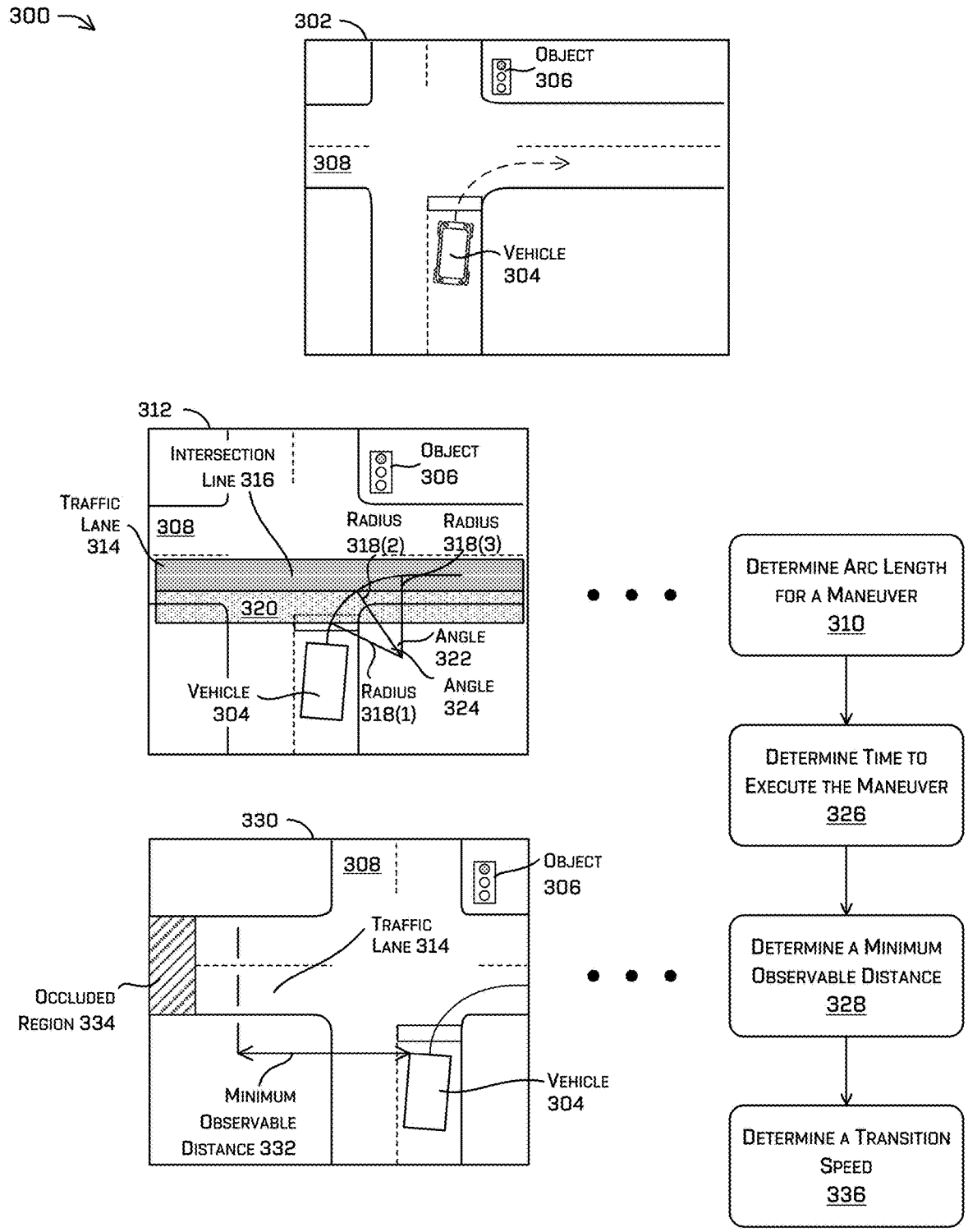
FIG. 3 is pictorial flow diagram for determining a transition speed based on an arc length for a maneuver, a time to execute the maneuver, and a desired observable distance to execute the maneuver, in accordance with examples of the disclosure.

FIG. 3 is pictorial flow diagram 300 for determining a transition speed based on an arc length for a maneuver, a time to execute the maneuver, and/or a desired observable distance to execute the maneuver, in accordance with examples of the disclosure.

An environment 302 includes a vehicle 304 (e.g., an autonomous vehicle) and an object 306 (e.g., a traffic signal), both located at a junction of a drivable region 308. The object 306 may be displaying a stop signal, such as a red light, indicating that traffic approaching from an opposite side of the junction of the drivable is to stop. The vehicle 304 may be in a stop state of a state machine, having executed an approach state and a prepare to stop state as described above with reference to FIG. 1. As illustrated, the vehicle 304 is a first vehicle at the junction, without any additional vehicles between the vehicle 304 and a stop line of the junction. In some examples, before transitioning to a proceed with caution state, the vehicle 304 may determine a caution region through which the proceed with caution state will be executed, along with a transition speed to approach the caution region and a transition speed to traverse the caution region. Similar to the description of FIG. 2, a caution region for making the right turn may provide sufficient allowance for a vehicle to yield to oncoming vehicles in intersecting lanes of the junction. However, unlike the straight path of the vehicle through the junction described in relation to FIG. 2, the path to execute a turn in the environment 302 is curved, and therefore the geometry of the caution region and transition speed for the turn maneuver may be different.

An operation 310 includes determining an arc length for a maneuver, such as a right turn at the stop signal displayed by the object 306. Because different junctions may be different sizes and involve different turning angles, the arc length may be determined on-the-fly, e.g., on a junction-by-junction basis. An example formula for determining an arc length may be as follows:

$$\text{arc\_length} = r*(b-a) \tag{4}$$

In the above equation, a and b may be in radians, and r=1/curvature. The variable α may be known as a difference between the tangent of an intersecting vehicle's path and the tangent of the vehicle's reference at an intersection line associated with the intersecting traffic lane.

In some examples, a predetermined parallel offset may be used in determining the arc length. The parallel offset may correspond to a set distance from an intersecting traffic lane and/or an intersection line, where the set distance provides other vehicles in the intersecting traffic lane with space to pass the vehicle and be confident that the vehicle will yield. In the examples described, a parallel offset of 2.5 meters is used, although any suitable parallel offset may be applied (e.g., 2 m, 2.75 m, 3 m, 5 m, etc.). Applying a parallel provides:

$$2.5 \text{ m} = r*(\cos(a) - \cos(b)) \tag{5}$$

$$\leftrightarrow b = a*\cos\left(\cos(a) - \frac{2.5 \text{ m}}{r}\right) \tag{6}$$

Inserting Equation (6) into Equation (4) results in the following:

$$\text{arc\_length} = r*\left(a*\cos\left(\cos(a) - \frac{2.5 \text{ m}}{r}\right) - a\right) \tag{7}$$

Although the discussion herein generally relates to right-hand turns, Equation 7 may be applied for any type of turn (e.g., left-hand turns), merging paths, crossing paths, and/or "straight" portions of a drivable region having a large radius. However, in some examples, a radius of a turn to which Equation 7 is applied must be greater than the parallel offset used in Equation 7, and the crossing angle between 0 and π/2 radians.

To illustrate, an environment 312 includes a representation of the vehicle 304 in the drivable region 308, along with the object 306. The vehicle 304 is making a right-hand turn into a traffic lane 314 on a red light presented by the object 306, and may be in a stop state of a right-on-red state machine. The traffic lane 314 includes an intersection line 316, which represents a point at which the vehicle 304 will collide with another vehicle in the traffic lane 314 within the junction, if both vehicles are at the same location at the same time. Equation 7 above may use a radius 318 of the right turn (inverse curvature associated with the particular portion of the road segment), along with a tangent of the arc associated with the location and orientation of the vehicle 304 when in a "stop" state, and a tangent of the arc associated with the location and orientation of the intersection line 316 as inputs. The turn is approximated as part of a circle with a fixed radius, indicated by the radii 318(1), 318(2), and 318(3). The tangents may be used to determine a location of a parallel offset 320 in relation to the tangent of the intersection line 316 at the curve. The tangent of the intersection line 316 may correspond to a yaw of the vehicle 304 at the intersection line 316.

Once again referencing Equation 7 with respect to the environment 312, r may correspond to a length of the radii 318(1), 318(2), and/or 318(3). The variable a may correspond to an angle 322, which is formed by the radius 318(3) at the intersection of the curve with the intersection line 316, and the radius 318(2) at the intersection of the curve with a lane reference of the traffic lane 314. The lane reference of the traffic lane 314 may be determined by applying the parallel offset distance from the intersection line 316 in a direction towards the vehicle 304, although other techniques may be used to determine the lane reference (e.g., based on sensor data detecting a width of the lane, based on map data, etc.). The variable b as incorporated into Equation 7 may be dependent upon a width of the parallel offset as described above with relation to Equation 6. The variable b corresponds to an angle 324 which is formed by the radius 318(2) at the intersection of the curve with the lane reference of the traffic lane 314, and the radius 318(1), which may be located at the intersection of the curve with the parallel offset 320, or at a stop position where the vehicle 304 is stopped. The arc length determined using Equation 7 defines the caution region, which may be used in the proceed with caution state described herein.

Once the arc length is determined by operation 310, an operation 326 determines a time to execute the maneuver. The time to execute the maneuver may correspond to a maximum speed, such as a speed limit associated with the drivable region 308 and/or how fast the vehicle 304 can accelerate within the caution region without overtaking the maximum speed. In some examples, the maximum speed may be associated with a transition speed for the caution region and how fast the vehicle 304 accelerates to reach the transition speed within the caution region.

An operation 328 determines a minimum observable distance, such as a minimum observable distance to execute the maneuver, based on the time to execute the maneuver. In some examples, the minimum observable distance may be determined by multiplying the estimated time to execute the maneuver by a threshold speed associated with a speed limit of the drivable region 308. For instance, the threshold speed may be equal to the speed limit of the drivable region 308, or may be greater than the speed limit of the drivable region 308 to account for potential speeding vehicles approaching from the intersecting lane of traffic.

For example, an environment 330 includes a representation of the vehicle 304 in the drivable region 308, along with the object 306. The vehicle 304 may have calculated an arc length to execute a right-turn-on-red maneuver, and a time to execute the maneuver. The vehicle 304 may then multiply the time to execute the maneuver with a threshold speed of 10% more than a speed limit of the drivable region 308, to determine a minimum observable distance 332 to execute the maneuver. The environment also includes an occluded region 334, which is outside of the minimum observable distance 332 in this example. Therefore, the vehicle 304 may have sufficient time to observe whether another vehicle is approaching in the traffic lane 314 that the vehicle 304 is obligated to yield to, and safely execute the right-on-red maneuver. In some examples, however, if the occluded region 334 obstructs all or a portion of the traffic lane 314 within the minimum observable distance 332, the vehicle 304 may not have adequate time to observe an approaching vehicle, and therefore may forego executing the right-on-red maneuver for safety purposes. In yet other examples, the presence of occlusions may influence a transition speed of the vehicle as it approaches the right-on-red maneuver/ transition in the state machine. As a non-limiting example, such a transition speed may linearly vary from a minimum to a maximum speed based at least in part on a ratio of the visible area to a maximum visible region obtainable by sensors of the vehicle to complete the maneuver.

If the portion of the environment represented by the minimum observable distance is unoccluded, an operation 336 determines a transition speed for traversing the caution region defined by the arc length. The transition speed may be a speed that allows the vehicle 304 to stop (or sufficiently slow down) if another vehicle approaches in the traffic lane 314, which the vehicle 304 is obligated to yield to due to the red traffic signal presented by the object 306. In some cases, the transition speed may be a linearly-increasing speed as the vehicle 304 traverses the caution region making the turn, may be increased and/or decreased based on an amount/ distance of visibility into the traffic lane 314, and so forth. The caution region corresponding to the arc length may be cleared similarly to the discussion of clearing caution regions described in relation to FIG. 2, such as when the vehicle 304 crosses or intersects the intersection line 316 of the traffic lane 314, and/or when the vehicle 304 crosses or intersects the lane reference of the traffic lane described above.

Figure 4:
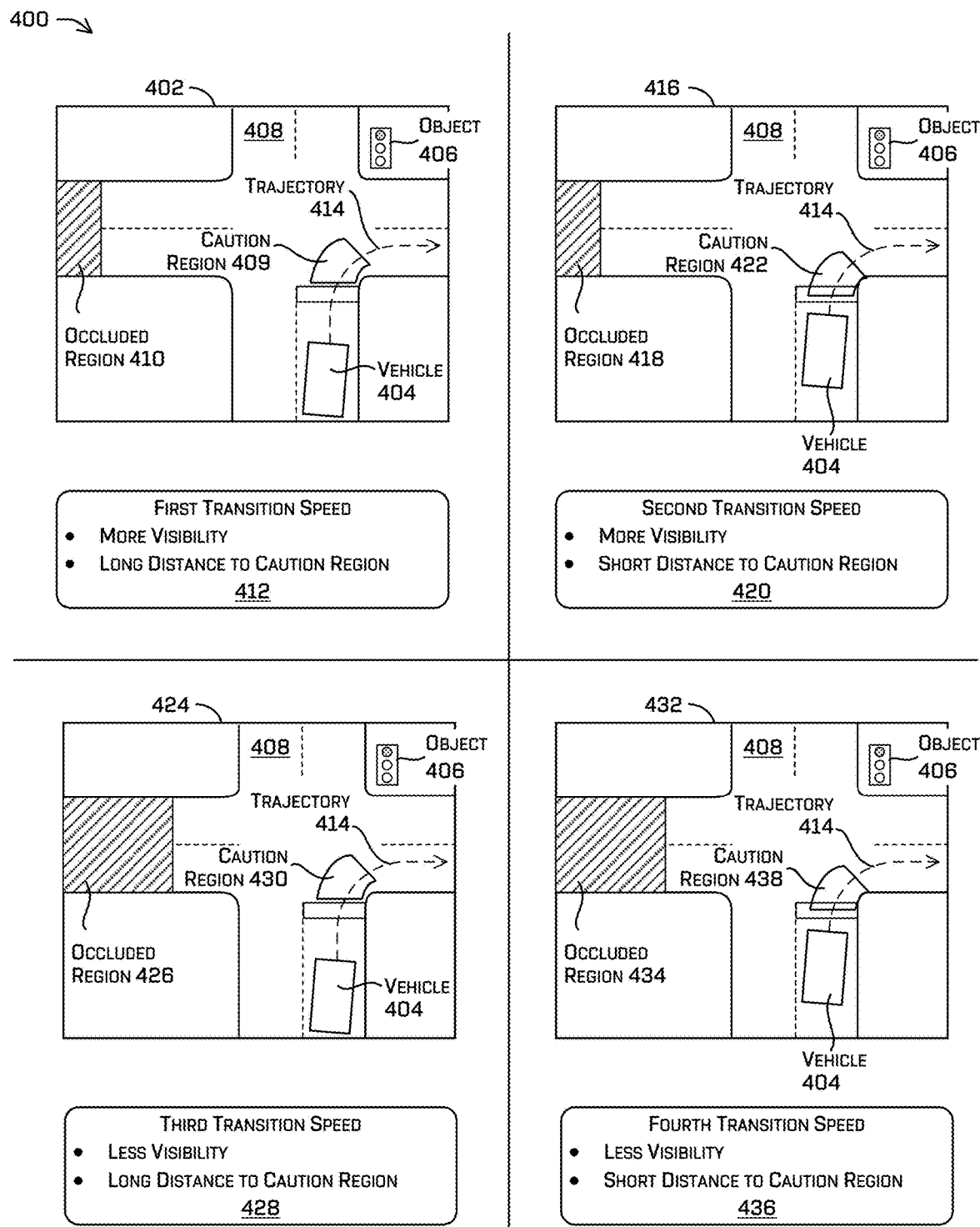
FIG. 4 illustrates example environments for executing different transition speeds based on visibility and distance to a caution region, in accordance with examples of the disclosure.

FIG. 4 illustrates example environments 400 for executing different transition speeds based on visibility and distance to a caution region, in accordance with examples of the disclosure.

An environment 402 includes a representation of a vehicle 404 (e.g., an autonomous vehicle) and an object 406 located at a junction of a drivable region 408. The vehicle 404 may be in a stop state of a junction state machine, while the object 406 displays a stop signal (e.g., a red light) indicating for the vehicle 404 to stop. The vehicle 404 may have determined a caution region 409 associated with a right-hand turn maneuver at the junction, including an arc length to execute the maneuver as described herein. Additionally, the vehicle 404 may detect an occluded region 410 of the environment 402, which is obstructed from view of sensors of the vehicle 404.

The vehicle 404 may determine first a transition speed 412 for the scenario presented in the environment 402 based on an amount and/or distance of visibility and a distance to the caution region 409. In this case, the occluded region 410 is a greater distance away, and may be outside of a minimum observable distance as described in relation to FIG. 3. The vehicle 404 may be a long distance from the caution region 409 while at the stop position of the junction. Because there is a larger amount of visibility and the distance to the caution region 409 is long, the first transition speed 412 that the vehicle 404 may use to follow a trajectory 414 to turn at the junction may be set higher when entering and traversing the caution region 409.

An environment 416 also includes the representation of the vehicle 404 and the object 406 located at a junction of the drivable region 408. The vehicle 404 may be in a stop state of a junction state machine, while the object 406 displays a stop signal. The vehicle 404 may also have determined a caution region 422 for executing a right-turn-on-red maneuver. Additionally, the vehicle 404 may detect an occluded region 418 of the environment 416, which is obstructed from view of sensors of the vehicle 404.

The vehicle 404 may determine a second transition speed 420 for the scenario presented in the environment 416 based on an amount and/or distance of visibility and a distance to the caution region 422. In this case, the occluded region 418 is a greater distance away, and may be outside of a minimum observable distance. However, the vehicle 404 may be a shorter distance from the caution region 422 while at the stop position of the junction. Because there is a larger amount of visibility but the distance between the vehicle 404 and the caution region 422 is short, the second transition speed 420 that the vehicle 404 may use to follow the trajectory 414 to turn at the junction may be set lower than the first transition speed 412 when entering and traversing the caution region 422.

Additionally, an environment 424 includes the representation of the vehicle 404 and the object 406 located at a junction of the drivable region 408. The vehicle 404 may be in a stop state of a junction state machine, while the object 406 displays a stop signal. The vehicle 404 may also have determined a caution region 430 for executing a right-turn-on-red maneuver. Additionally, the vehicle 404 may detect an occluded region 426 of the environment 424, which is obstructed from view of sensors of the vehicle 404.

The vehicle 404 may determine a third transition speed 428 for the scenario presented in the environment 424 based on an amount and/or distance of visibility and a distance to the caution region 430. In this case, the occluded region 426 is a lesser distance away than the occluded region 410 of the environment 402 and the occluded region 418 of the environment 424, although may still be outside of a minimum observable distance. The vehicle 404 may be a longer distance from the caution region 430 while at the stop position of the junction. Because the distance to the caution region 430 is long but there is a smaller amount of visibility, the third transition speed 428 that the vehicle 404 may use to follow the trajectory 414 to turn at the junction may be set lower than the first transition speed 412 when entering and traversing the caution region 430.

An environment 432 includes the representation of the vehicle 404 and the object 406 located at a junction of the drivable region 408. The vehicle 404 may be in a stop state of a junction state machine, while the object 406 displays a stop signal. The vehicle 404 may also have determined a caution region 438 for executing a right-turn-on-red maneuver. Additionally, the vehicle 404 may detect an occluded region 434 of the environment 432, which is obstructed from view of sensors of the vehicle 404.

The vehicle 404 may determine a fourth transition speed 436 for the scenario presented in the environment 432 based on an amount and/or distance of visibility and a distance to the caution region 438. In this case, the occluded region 434 is a lesser distance away, although may still be outside of a minimum observable distance. The vehicle 404 may be a shorter distance from the caution region 438 while at the stop position of the junction. Because the distance to the caution region 438 is shorter, and there is a smaller amount of visibility, the fourth transition speed 436 that the vehicle 404 may use to follow the trajectory 414 to turn at the junction may be set even lower than the second transition speed 420 and the third transition speed 428 (e.g., to a slowest transition speed of the four presented scenarios) when entering and traversing the caution region 438.

Of course, in any of the examples described herein and depicted in FIG. 4, as the vehicle proceeds according to the transition speed, the distance to complete the maneuver decreases as well. As such, an amount of time to complete the maneuver decreases. Therefore, by creeping according to the varying transition speeds (which may be constant, linear, non-linear, etc. and/or based on a visibility), the vehicle 404 is able to obtain more information (more sensor visibility), reduce a time to perform a maneuver (right-on-red), and increase safe operations of the vehicle.

Figure 5:
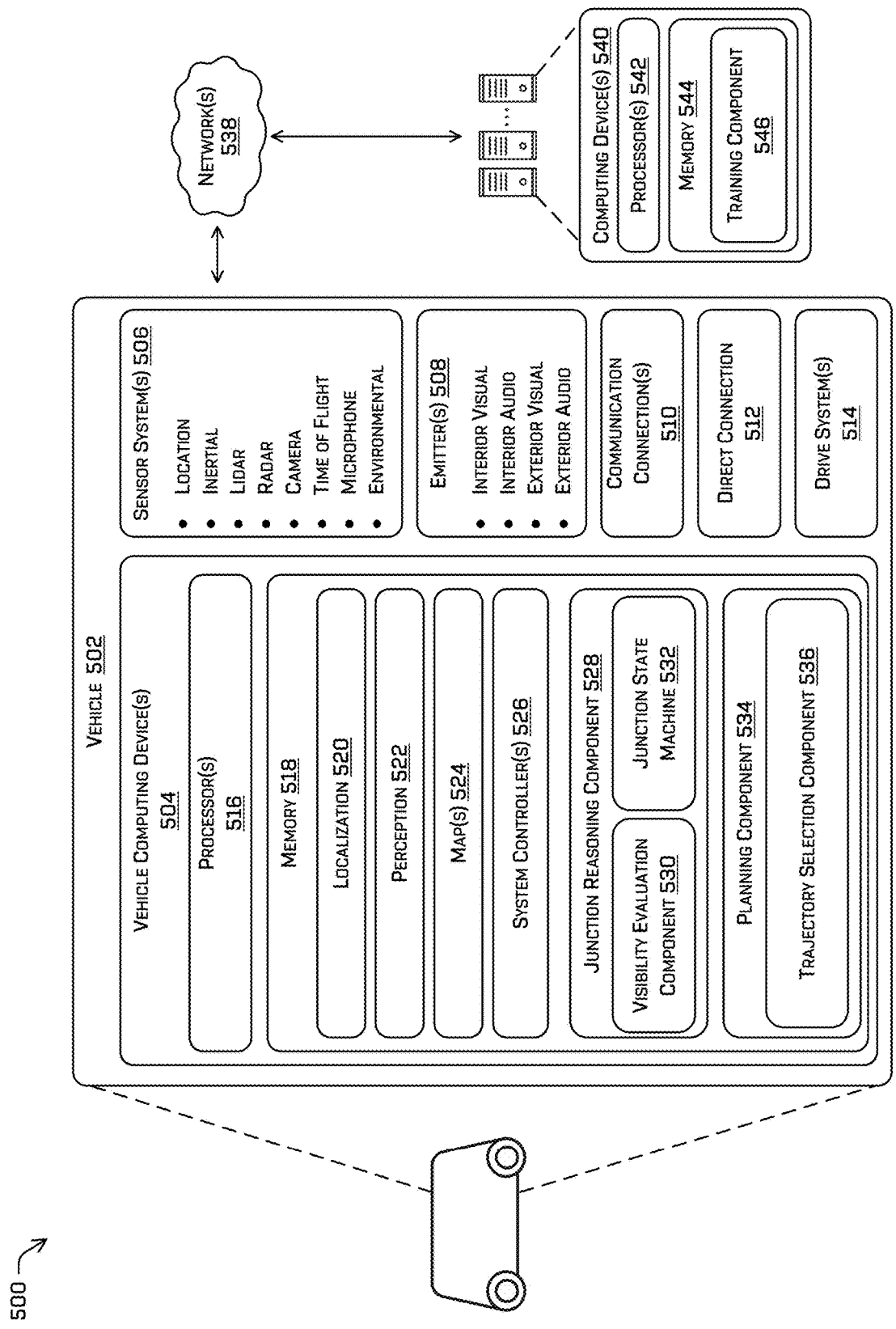
FIG. 5 depicts a block diagram of an example system for implementing the techniques described herein.

FIG. 5 depicts a block diagram of an example system 500 for implementing the techniques described herein. In at least one example, the system 500 can include a vehicle 502, which can correspond to the vehicle 106 of FIG. 1, the vehicle 206 of FIG. 2, the vehicle 304 of FIG. 3, and/or the vehicle 404 of FIG. 4.

The vehicle 502 can include vehicle computing device(s) 504, one or more sensor systems 506, one or more emitters 508, one or more communication connections 510, at least one direct connection 512, and one or more drive systems 514. The vehicle computing device(s) 504 can include one or more processors 516 and memory 518 communicatively coupled with the one or more processors 516. In the illustrated example, the vehicle 502 is an autonomous vehicle; however, the vehicle 502 could be any other type of vehicle or robotic platform. In the illustrated example, the memory 518 of the vehicle computing device(s) 504 stores a localization component 520, a perception component 522, one or more maps 524, one or more system controllers 526, a junction reasoning component 528, a visibility evaluation component 530, a junction state machine 532, a planning component 534, and a trajectory selection component 536. Though depicted in FIG. 5 as residing in the memory 518 for illustrative purposes, it is contemplated that the localization component 520, the perception component 522, the one or more maps 524, the one or more system controllers 526, the junction reasoning component 528, the visibility evaluation component 530, the junction state machine 532, the planning component 534, and the trajectory selection component 536 can additionally, or alternatively, be accessible to the vehicle 502 (e.g., stored on, or otherwise accessible by, memory remote from the vehicle 502).

In at least one example, the localization component 520 can include functionality to receive data from the sensor system(s) 506 to determine a position and/or orientation of the vehicle 502 (e.g., one or more of an x-, y-, z-position, roll, pitch, or yaw). For example, the localization component 520 can include and/or request/receive a map of an environment and can continuously determine a location and/or orientation of the autonomous vehicle within the map. In some instances, the localization component 520 can utilize SLAM (simultaneous localization and mapping), CLAMS (calibration, localization and mapping, simultaneously), relative SLAM, bundle adjustment, non-linear least squares optimization, or the like to receive image data, lidar data, radar data, time of flight data, IMU data, GPS data, wheel encoder data, and the like to accurately determine a location of the autonomous vehicle. In some instances, the localization component 520 can provide data to various components of the vehicle 502 to determine a position of an autonomous vehicle for generating a trajectory and/or for determining to retrieve map data from memory, as discussed herein.

In some instances, the perception component 522 can include functionality to perform object detection, segmentation, and/or classification. In some examples, the perception component 522 can provide processed sensor data that indicates a presence of an entity that is proximate to the vehicle 502 and/or a classification of the entity as an entity type (e.g., car, pedestrian, cyclist, animal, building, tree, road surface, curb, sidewalk, stoplight, stop sign, unknown, etc.). In additional or alternative examples, the perception component 522 can provide processed sensor data that indicates one or more characteristics associated with a detected entity (e.g., a tracked object) and/or the environment in which the entity is positioned. In some examples, characteristics associated with an entity can include, but are not limited to, an x-position (global and/or local position), a y-position (global and/or local position), a z-position (global and/or local position), an orientation (e.g., a roll, pitch, yaw), an entity type (e.g., a classification), a velocity of the entity, an acceleration of the entity, an extent of the entity (size), etc. Characteristics associated with the environment can include, but are not limited to, a presence of another entity in the environment, a state of another entity in the environment, a time of day, a day of a week, a season, a weather condition, an indication of darkness/light, etc.

The memory 518 can further include one or more maps 524 that can be used by the vehicle 502 to navigate within the environment. For the purpose of this discussion, a map can be any number of data structures modeled in two dimensions, three dimensions, or N-dimensions that are capable of providing information about an environment, such as, but not limited to, topologies (such as intersections), streets, mountain ranges, roads, terrain, and the environment in general. In some instances, a map can include, but is not limited to: texture information (e.g., color information (e.g., RGB color information, Lab color information, HSV/HSL color information), and the like), intensity information (e.g., lidar information, radar information, and the like); spatial information (e.g., image data projected onto a mesh, individual "surfels" (e.g., polygons associated with individual color and/or intensity)), reflectivity information (e.g., specularity information, retroreflectivity information, BRDF information, BSSRDF information, and the like). In one example, a map can include a three-dimensional mesh of the environment. In some instances, the map can be stored in a tiled format, such that individual tiles of the map represent a discrete portion of an environment, and can be loaded into working memory as needed. In at least one example, the one or more maps 524 can include at least one map (e.g., images and/or a mesh). In some examples, the vehicle 502 can be controlled based at least in part on the maps 524. That is, the maps 524 can be used in connection with the localization component 520, the perception component 522, the junction reasoning component 528, and/or the planning component 534 to determine a location of the vehicle 502, identify objects in an environment, and/or generate routes and/or trajectories to navigate within an environment.

In some examples, the one or more maps 524 can be stored on a remote computing device(s) (such as the computing device(s) 540) accessible via network(s) 538. In some examples, multiple maps 524 can be stored based on, for example, a characteristic (e.g., type of entity, time of day, day of week, season of the year, etc.). Storing multiple maps 524 can have similar memory requirements, but increase the speed at which data in a map can be accessed.

In general, the junction reasoning component 528 can determine how to control the vehicle 502 at a junction associated with a traffic light, such as to make a right turn on a red light at the junction. In some instances, the junction reasoning component 528 can provide information to the planning component 534 to determine when and/or how to control the vehicle 502 to traverse an environment. As discussed herein, the junction reasoning component 528 can receive lidar data, image data, map data, and the like to determine actions based on conditions associated with a junction when presented with a stop signal, such as by using a state machine as described herein.

The visibility evaluation component 530 included in the junction reasoning component 528 determines visible regions of the environment, and whether the visible regions are sufficient to transition states within the junction state machine 532. The visibility evaluation component 530 may, for instance, determine a distance of the vehicle 502 from a maneuver position, such as a stop line of a junction. In some examples, the visibility evaluation component 530 may determine occluded regions of an environment, which may be used in determining whether a minimum visibility threshold is met to execute a right-on-red maneuver. Further, in some cases, the visibility evaluation component 530 may analyze trajectories of objects in the environment, such as other vehicles approaching from an intersecting lane of traffic, to determine whether the vehicle 502 should yield or continue with a maneuver.

The junction state machine 532 may be used by the junction reasoning component 528 to control the vehicle 502 to execute a right-turn-on-red maneuver. For example, the junction reasoning component 528 may begin by approaching a junction having a traffic signal in an approach state of the junction state machine 532, in which the vehicle 502 may detect a stop signal being presented. The junction reasoning component 528 may transition to a prepare to stop state of the junction state machine 532, in which the vehicle determines a stop location based on whether the vehicle 502 can reach a position suitable for executing the maneuver. Next, the junction reasoning component 528 may transition to a stop state of the junction state machine 532, where the vehicle 502 determines whether it is within a threshold distance of the maneuver position and whether the vehicle 502 has been stopped for a threshold amount of time. If both conditions are met in the stop state, the junction reasoning component 528 may transition to a proceed with caution state of the junction state machine 532, where a visibility distance and maneuver execution time are used to determine a transition speed to traverse a caution region of the junction. Then, the junction reasoning component 528 may transition to a go state of the junction state machine 532, in which the vehicle 502 is controlled to traverse the junction.

In general, the planning component 534 can determine a path for the vehicle 502 to follow to traverse the environment. For example, the planning component 534 can determine various routes and trajectories and various levels of detail. For example, the planning component 534 can determine a route to travel from a first location (e.g., a current location) to a second location (e.g., a target location). For the purpose of this discussion, a route can be a sequence of waypoints for travelling between two locations. As non-limiting examples, waypoints include streets, intersections, global positioning system (GPS) coordinates, etc. Further, the planning component 534 can generate an instruction for guiding the autonomous vehicle along at least a portion of the route from the first location to the second location. In at least one example, the planning component 534 can determine how to guide the autonomous vehicle from a first waypoint in the sequence of waypoints to a second waypoint in the sequence of waypoints. In some examples, the instruction can be a trajectory, or a portion of a trajectory. In some examples, multiple trajectories can be substantially simultaneously generated (e.g., within technical tolerances) in accordance with a receding horizon technique, wherein one of the multiple trajectories is selected for the vehicle 502 to navigate.

In some instances, the planning component 534 can generate one or more trajectories for the vehicle 502 based at least in part on determined visibility at a junction and/or an estimated time to execute a maneuver, as discussed herein. In some examples, the planning component 534 can use temporal logic, such as linear temporal logic and/or signal temporal logic, to evaluate one or more trajectories of the vehicle 502.

In at least one example, the vehicle computing device(s) 504 can include one or more system controllers 526, which can be configured to control steering, propulsion, braking, safety, emitters, communication, and other systems of the vehicle 502. These system controller(s) 526 can communicate with and/or control corresponding systems of the drive system(s) 514 and/or other components of the vehicle 502.

As can be understood, the components discussed herein (e.g., the localization component 520, the perception component 522, the one or more maps 524, the one or more system controllers 526, the junction reasoning component 528, the visibility evaluation component 530, the junction state machine 532, the planning component 534, and the trajectory selection component 536) are described as divided for illustrative purposes. However, the operations performed by the various components can be combined or performed in any other component. By way of example, visibility evaluation and/or state machine transitioning functions may be performed by the perception component 522 (e.g., rather than the junction reasoning component 528) to reduce the amount of data transferred by the system.

In at least one example, the sensor system(s) 506 can include lidar sensors, radar sensors, ultrasonic transducers, sonar sensors, location sensors (e.g., GPS, compass, etc.), inertial sensors (e.g., inertial measurement units (IMUs), accelerometers, magnetometers, gyroscopes, etc.), cameras (e.g., RGB, IR, intensity, depth, time of flight, etc.), microphones, wheel encoders, environment sensors (e.g., temperature sensors, humidity sensors, light sensors, pressure sensors, etc.), etc. The sensor system(s) 506 can include multiple instances of each of these or other types of sensors. For instance, the lidar sensors can include individual lidar sensors located at the corners, front, back, sides, and/or top of the vehicle 502. As another example, the camera sensors can include multiple cameras disposed at various locations about the exterior and/or interior of the vehicle 502. The sensor system(s) 506 can provide input to the vehicle computing device(s) 504. Additionally or alternatively, the sensor system(s) 506 can send sensor data, via the one or more networks 538, to the one or more computing device(s) at a particular frequency, after a lapse of a predetermined period of time, in near real-time, etc.

The vehicle 502 can also include one or more emitters 508 for emitting light and/or sound, as described above. The emitters 508 in this example include interior audio and visual emitters to communicate with passengers of the vehicle 502. By way of example and not limitation, interior emitters can include speakers, lights, signs, display screens, touch screens, haptic emitters (e.g., vibration and/or force feedback), mechanical actuators (e.g., seatbelt tensioners, seat positioners, headrest positioners, etc.), and the like. The emitters 508 in this example also include exterior emitters. By way of example and not limitation, the exterior emitters in this example include lights to signal a direction of travel or other indicator of vehicle action (e.g., indicator lights, signs, light arrays, etc.), and one or more audio emitters (e.g., speakers, speaker arrays, horns, etc.) to audibly communicate with pedestrians or other nearby vehicles, one or more of which comprising acoustic beam steering technology.

The vehicle 502 can also include one or more communication connection(s) 510 that enable communication between the vehicle 502 and one or more other local or remote computing device(s). For instance, the communication connection(s) 510 can facilitate communication with other local computing device(s) on the vehicle 502 and/or the drive system(s) 514. Also, the communication connection(s) 510 can allow the vehicle to communicate with other nearby computing device(s) (e.g., other nearby vehicles, traffic signals, etc.). The communications connection(s) 510 also enable the vehicle 502 to communicate with a remote teleoperations computing device or other remote services.

The communications connection(s) 510 can include physical and/or logical interfaces for connecting the vehicle computing device(s) 504 to another computing device or a network, such as network(s) 538. For example, the communications connection(s) 510 can enable Wi-Fi-based communication such as via frequencies defined by the IEEE 802.11 standards, short range wireless frequencies such as Bluetooth®, cellular communication (e.g., 2G, 3G, 4G, 4G LTE, 5G, etc.) or any suitable wired or wireless communications protocol that enables the respective computing device to interface with the other computing device(s).

In at least one example, the vehicle 502 can include one or more drive systems 514. In some examples, the vehicle 502 can have a single drive system 514. In at least one example, if the vehicle 502 has multiple drive systems 514, individual drive systems 514 can be positioned on opposite ends of the vehicle 502 (e.g., the front and the rear, etc.). In at least one example, the drive system(s) 514 can include one or more sensor systems to detect conditions of the drive system(s) 514 and/or the surroundings of the vehicle 502. By way of example and not limitation, the sensor system(s) can include one or more wheel encoders (e.g., rotary encoders) to sense rotation of the wheels of the drive modules, inertial sensors (e.g., inertial measurement units, accelerometers, gyroscopes, magnetometers, etc.) to measure orientation and acceleration of the drive module, cameras or other image sensors, ultrasonic sensors to acoustically detect objects in the surroundings of the drive system, lidar sensors, radar sensors, etc. Some sensors, such as the wheel encoders can be unique to the drive system(s) 514. In some cases, the sensor system(s) on the drive system(s) 514 can overlap or supplement corresponding systems of the vehicle 502 (e.g., sensor system(s) 506).

The drive system(s) 514 can include many of the vehicle systems, including a high voltage battery, a motor to propel the vehicle, an inverter to convert direct current from the battery into alternating current for use by other vehicle systems, a steering system including a steering motor and steering rack (which can be electric), a braking system including hydraulic or electric actuators, a suspension system including hydraulic and/or pneumatic components, a stability control system for distributing brake forces to mitigate loss of traction and maintain control, an HVAC system, lighting (e.g., lighting such as head/tail lights to illuminate an exterior surrounding of the vehicle), and one or more other systems (e.g., cooling system, safety systems, onboard charging system, other electrical components such as a DC/DC converter, a high voltage junction, a high voltage cable, charging system, charge port, etc.). Additionally, the drive system(s) 514 can include a drive system controller which can receive and preprocess data from the sensor system(s) and to control operation of the various vehicle systems. In some examples, the drive system controller can include one or more processors and memory communicatively coupled with the one or more processors. The memory can store one or more components to perform various functionalities of the drive system(s) 514. Furthermore, the drive system(s) 514 also include one or more communication connection(s) that enable communication by the respective drive system with one or more other local or remote computing device(s).

In at least one example, the direct connection 512 can provide a physical interface to couple the one or more drive system(s) 514 with the body of the vehicle 502. For example, the direct connection 512 can allow the transfer of energy, fluids, air, data, etc. between the drive system(s) 514 and the vehicle. In some instances, the direct connection 512 can further releasably secure the drive system(s) 514 to the body of the vehicle 502.

In at least one example, the localization component 520, the perception component 522, the one or more maps 524, the one or more system controllers 526, the junction reasoning component 528, the visibility evaluation component 530, the junction state machine 532, the planning component 534, and the trajectory selection component 536 can process sensor data, as described above, and can send their respective outputs, over the one or more network(s) 538, to one or more computing device(s) 540. In at least one example, the localization component 520, the perception component 522, the one or more maps 524, the one or more system controllers 526, the junction reasoning component 528, the visibility evaluation component 530, the junction state machine 532, the planning component 534, and the trajectory selection component 536 can send their respective outputs to the one or more computing device(s) 540 at a particular frequency, after a lapse of a predetermined period of time, in near real-time, etc.

In some examples, the vehicle 502 can send sensor data to one or more computing device(s) 540 via the network(s) 538. In some examples, the vehicle 502 can send raw sensor data to the computing device(s) 540. In other examples, the vehicle 502 can send processed sensor data and/or representations of sensor data to the computing device(s) 540. In some examples, the vehicle 502 can send sensor data to the computing device(s) 540 at a particular frequency, after a lapse of a predetermined period of time, in near real-time, etc. In some cases, the vehicle 502 can send sensor data (raw or processed) to the computing device(s) 540 as one or more log files.

The computing device(s) 540 can include processor(s) 542 and a memory 544 storing a training component 546.

In some instances, the training component 546 can include functionality to train one or more models to determine stop locations for different junctions, minimum threshold stop times at a junction, maneuver execution times, optimized transition speeds, and the like. In some instances, the training component 546 can communicate information generated by the one or more models to the vehicle computing device(s) 504 to revise how to control the vehicle 502 in response to different situations.

For instance, aspects of some or all of the components discussed herein can include any models, algorithms, and/or machine learning algorithms. For example, in some instances, the components in the memory 544 (and the memory 518, discussed above) can be implemented as a neural network. In some examples, the training component 546 can utilize a neural network to generate and/or execute one or more models to improve various aspects of using a state machine for right-on-red maneuvers.

As described herein, an exemplary neural network is a biologically inspired algorithm which passes input data through a series of connected layers to produce an output. Each layer in a neural network can also comprise another neural network, or can comprise any number of layers (whether convolutional or not). As can be understood in the context of this disclosure, a neural network can utilize machine learning, which can refer to a broad class of such algorithms in which an output is generated based on learned parameters.

Although discussed in the context of neural networks, any type of machine learning can be used consistent with this disclosure. For example, machine learning algorithms can include, but are not limited to, regression algorithms (e.g., ordinary least squares regression (OLSR), linear regression, logistic regression, stepwise regression, multivariate adaptive regression splines (MARS), locally estimated scatterplot smoothing (LOESS)), instance-based algorithms (e.g., ridge regression, least absolute shrinkage and selection operator (LASSO), elastic net, least-angle regression (LARS)), decisions tree algorithms (e.g., classification and regression tree (CART), iterative dichotomiser 3 (ID 3), Chi-squared automatic interaction detection (CHAID), decision stump, conditional decision trees), Bayesian algorithms (e.g., naïve Bayes, Gaussian naïve Bayes, multinomial naïve Bayes, average one-dependence estimators (AODE), Bayesian belief network (BNN), Bayesian networks), clustering algorithms (e.g., k-means, k-medians, expectation maximization (EM), hierarchical clustering), association rule learning algorithms (e.g., perceptron, back-propagation, hopfield network, Radial Basis Function Network (RBFN)), deep learning algorithms (e.g., Deep Boltzmann Machine (DBM), Deep Belief Networks (DBN), Convolutional Neural Network (CNN), Stacked Auto-Encoders), Dimensionality Reduction Algorithms (e.g., Principal Component Analysis (PCA), Principal Component Regression (PCR), Partial Least Squares Regression (PLSR), Sammon Mapping, Multidimensional Scaling (MDS), Projection Pursuit, Linear Discriminant Analysis (LDA), Mixture Discriminant Analysis (MDA), Quadratic Discriminant Analysis (QDA), Flexible Discriminant Analysis (FDA)), Ensemble Algorithms (e.g., Boosting, Bootstrapped Aggregation (Bagging), AdaBoost, Stacked Generalization (blending), Gradient Boosting Machines (GBM), Gradient Boosted Regression Trees (GBRT), Random Forest), SVM (support vector machine), supervised learning, unsupervised learning, semi-supervised learning, etc.

Additional examples of architectures include neural networks such as ResNet 50, ResNet 101, VGG, DenseNet, PointNet, and the like.

The processor(s) 516 of the vehicle 502 and the processor(s) 542 of the computing device(s) 540 can be any suitable processor capable of executing instructions to process data and perform operations as described herein. By way of example and not limitation, the processor(s) 516 and 542 can comprise one or more Central Processing Units (CPUs), Graphics Processing Units (GPUs), or any other device or portion of a device that processes electronic data to transform that electronic data into other electronic data that can be stored in registers and/or memory. In some examples, integrated circuits (e.g., ASICs, etc.), gate arrays (e.g., FPGAs, etc.), and other hardware devices can also be considered processors in so far as they are configured to implement encoded instructions.

Memory 518 and 544 are examples of non-transitory computer-readable media. The memory 518 and 544 can store an operating system and one or more software applications, instructions, programs, and/or data to implement the methods described herein and the functions attributed to the various systems. In various implementations, the memory can be implemented using any suitable memory technology, such as static random access memory (SRAM), synchronous dynamic RAM (SDRAM), nonvolatile/Flash-type memory, or any other type of memory capable of storing information. The architectures, systems, and individual elements described herein can include many other logical, programmatic, and physical components, of which those shown in the accompanying figures are merely examples that are related to the discussion herein.

It should be noted that while FIG. 5 is illustrated as a distributed system, in alternative examples, components of the vehicle 502 can be associated with the computing device(s) 540 and/or components of the computing device(s) 540 can be associated with the vehicle 502. That is, the vehicle 502 can perform one or more of the functions associated with the computing device(s) 540, and vice versa. Further, aspects of the junction reasoning component 528 and/or the planning component 534 can be performed on any of the devices discussed herein.

Figure 6A:
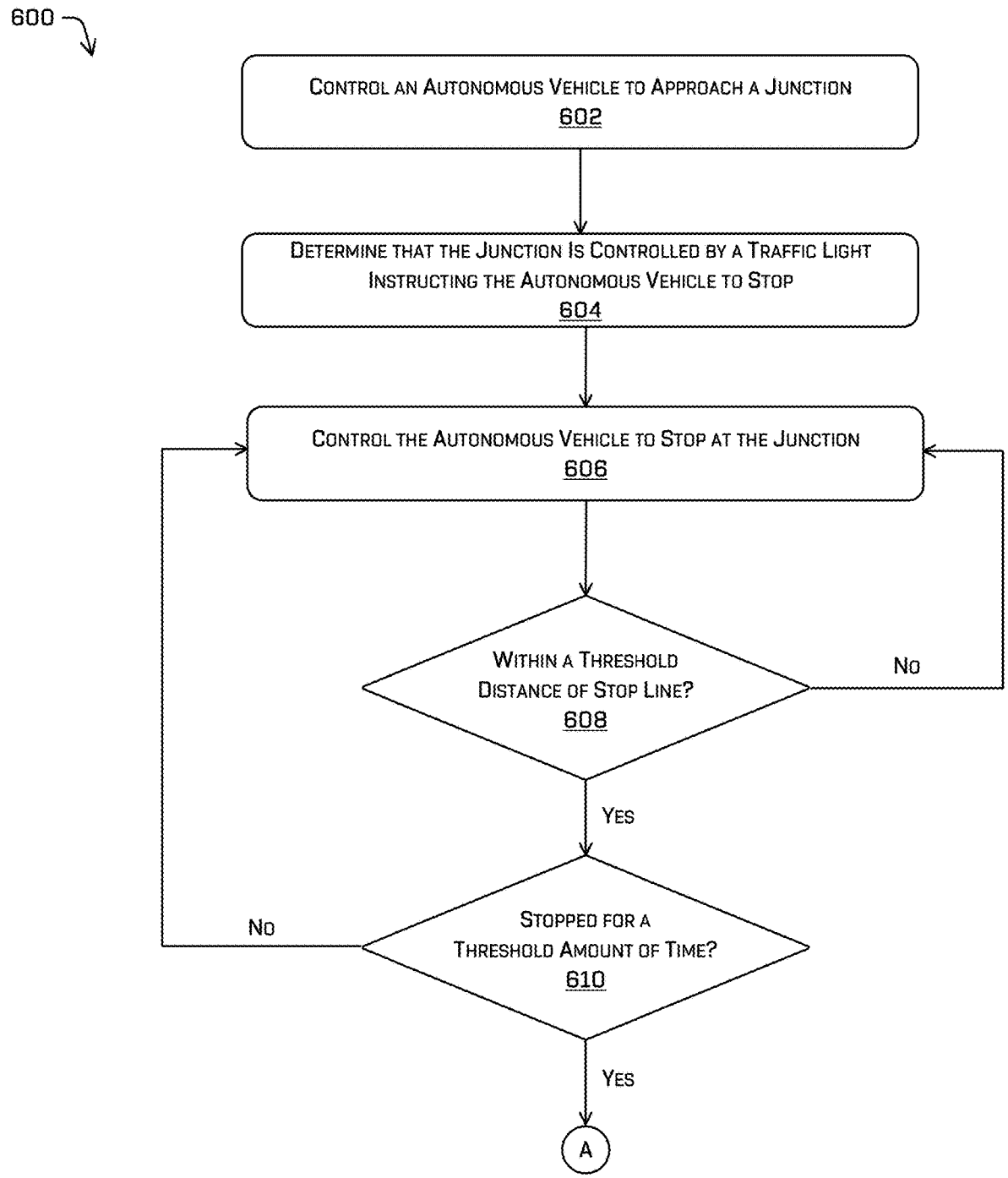
FIGS. 6A and 6B depict an example process for controlling an autonomous vehicle to stop at a junction, determining whether the autonomous vehicle has met threshold conditions while stopped at the junction, and controlling the autonomous vehicle to turn right at the junction based on whether a threshold portion of an occlusion grid is occupied, in accordance with examples of the disclosure.
Figure 6B:
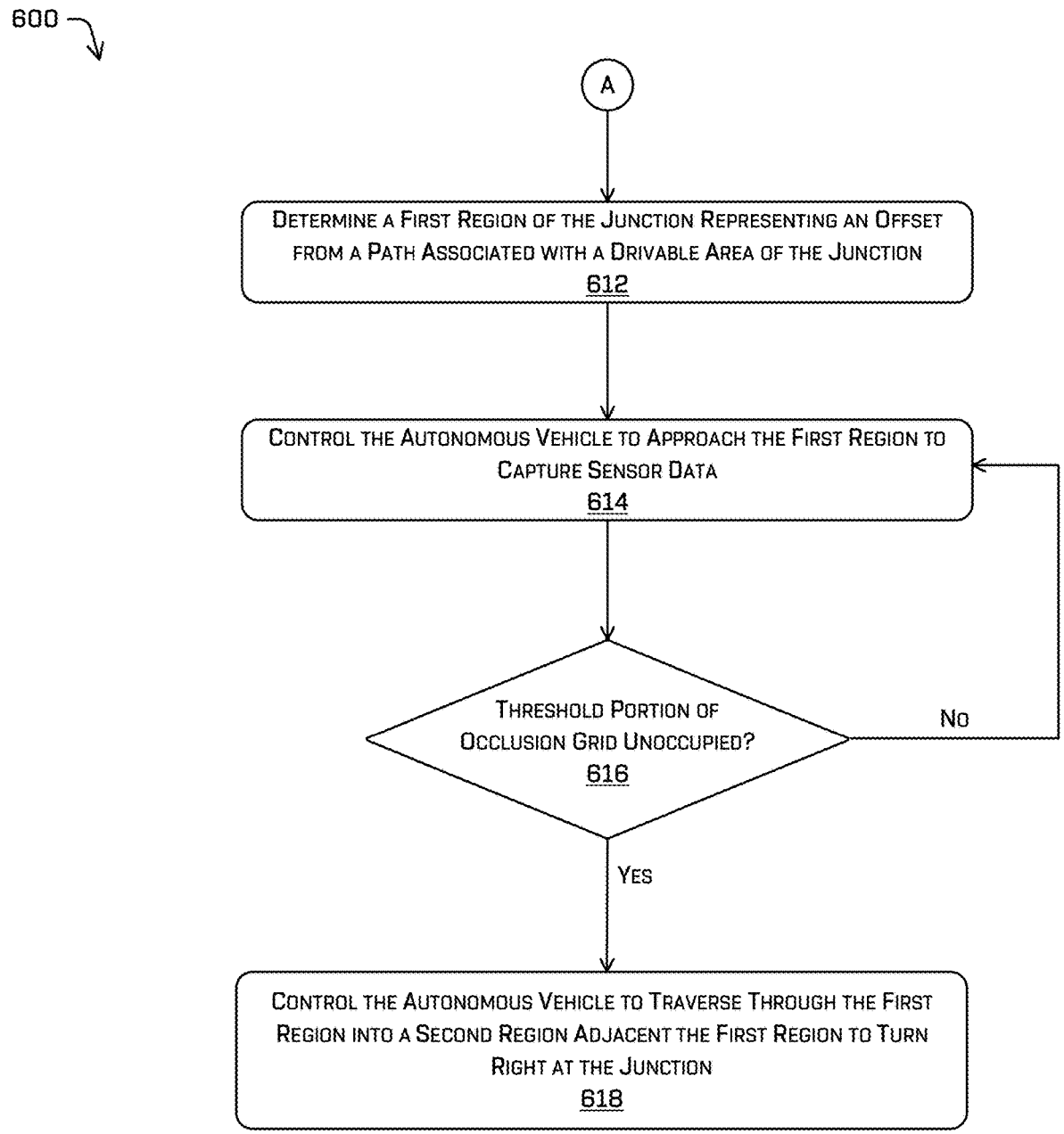

FIGS. 6A and 6B depict an example process 600 for controlling an autonomous vehicle to stop at a junction, determining whether the autonomous vehicle has met threshold conditions while stopped at the junction, and controlling the autonomous vehicle to turn right at the junction based on whether a threshold portion of an occlusion grid is occupied, in accordance with examples of the disclosure. For example, some or all of the process 600 can be performed by one or more components in FIG. 5, as described herein. For example, some or all of the process 600 can be performed by the vehicle computing device(s) 504. Further, any of the operations described in the example process 600 may be executed in parallel, in a different order than depicted in the process 600, omit any of the operations of the depicted process 600, and the like.

At operation 602, the process can include controlling an autonomous vehicle to approach a junction. For example, the operation 602 may include controlling the autonomous vehicle to determine a presence of the junction, e.g., from map data and/or based on data received from sensors of the vehicle.

At operation 604, the process can include determining that the junction is controlled by a traffic light instructing the autonomous vehicle to stop. In some examples, the operation 604 can include capturing lidar data, image data, radar data, time of flight data, and the like, of the environment to determine the presence of the traffic light and a signal presented by the traffic light (e.g., a red light) instructing the vehicle to stop.

At operation 606, the process can include controlling the autonomous vehicle to stop at the junction. In some examples, the operation 606 may include determining the presence of one or more vehicles between the autonomous vehicle and a stop line associated with the junction, in which case the operation 606 can cause the autonomous vehicle to stop an appropriate distance from the intervening vehicles. However, in some cases, there may be no other vehicles present ahead of the autonomous vehicle and the stop line associated with the junction, in which case the autonomous vehicle may stop an appropriate distance from the stop line.

At operation 608, the process can include determining whether the autonomous vehicle is within a threshold distance of a stop line. In some examples, the operation 608 may utilize sensor data, GPS, or other location data to determine whether the autonomous vehicle is within a threshold distance (e.g., 0.5 meters, 1 meter, 1.5 meters, 3 meters, etc.) of a stop line of the junction. If the autonomous vehicle is not within the threshold distance of the stop line, such as may be the case when another vehicle is between the autonomous vehicle and the stop line, the process may return to return to operation 606 to stop at the junction, either behind the other vehicle or at the stop line when the other vehicle moves.

If the autonomous vehicle is within the threshold distance of the stop line, operation 610 of the process can include determining whether the autonomous vehicle has been stopped for a threshold amount of time. The threshold amount of time may allow for traffic to proceed through the junction after a "fresh" red light that recently changed, or if the vehicle approached the traffic light when yellow. The threshold amount of time may be any suitable amount of time, such as a predetermined amount of time (e.g., 8 seconds), or an amount of time dependent upon a speed limit of the junction, to name a few examples. If the autonomous vehicle has not been stopped for the threshold amount of time, the process may return to the operation 606 to control the autonomous vehicle to stop at the junction.

If the autonomous vehicle has been stopped for a threshold amount of time, operation 612 of the process (continuing to FIG. 6B) can include determining a first region of the junction representing an offset from a path associated with a drivable area of the junction. In some examples, the drivable area of the junction may correspond to an intersecting lane of the junction that the autonomous vehicle is turning into. The offset may be a predefined distance (e.g., 2.5 meters) that allows vehicles traversing the intersecting lane of the junction to continue along the path of the intersecting lane without colliding into the autonomous vehicle (or sufficient distance to prevent fear of collision).

At operation 614, the process can include controlling the autonomous vehicle to approach the first region to capture sensor data. The operation 614 may include controlling the vehicle to approach the first region at a first transition speed which allows the autonomous vehicle to stop if another vehicle having a right-of-way at the junction approaches.

At operation 616, the process can include determining whether a threshold portion of an occlusion grid is unoccupied. The threshold portion of the occlusion grid may correspond to a minimum visible distance into the intersecting lane that is permissible for the vehicle to perform the right-on-red maneuver. If the portion of the occlusion grid is occupied, such as by an approaching vehicle, the process may return to operation 614 to continue capturing sensor data, e.g., until the portion is unoccupied.

If the portion is unoccupied, operation 618 of the process can include controlling the autonomous vehicle to traverse through the first region into a second region adjacent the first region to turn right at the junction. Once the autonomous vehicle has traversed through the first region (e.g., traversed through a threshold distance of the first region), the autonomous vehicle may be prevented from returning to previous operations while at the current junction, as doing so may result in a higher likelihood of collision with vehicles approaching in the intersecting lane.

Example Clauses

A: A system comprising: one or more processors; and one or more computer-readable media storing instructions executable by the one or more processors, wherein the instructions, when executed, cause the system to perform operations comprising: receiving first sensor data from a sensor on an autonomous vehicle; determining, based at least in part on the first sensor data, that the autonomous vehicle is approaching an intersection controlled by a traffic control device; determining, based at least in part on the first sensor data, that the traffic control device is instructing the autonomous vehicle to stop; determining that the autonomous vehicle is within a threshold distance to a stop line associated with the intersection; determining a first region associated with the intersection, the first region representing an offset from a path associated with a drivable area of the intersection; controlling the autonomous vehicle to traverse at least a portion of the first region at a speed to capture second sensor data; determining, based at least in part on the second sensor data, a visibility score; and controlling, based at least in part on the visibility score, the autonomous vehicle to traverse through the first region into a second region adjacent the first region to turn right at the intersection into a lane based at least in part on the visibility score.

B: The system of paragraph A, the operations further comprising: determining a length of an arc from a location of the autonomous vehicle to an intersection of the arc with the drivable area; wherein the speed is based at least in part on one or more of a position of the autonomous vehicle with respect to the first region, the length of the arc, or the visibility score.

C: The system of paragraph A or B, further comprising: determining a minimum observable distance associated with the intersection; determining a distance visible to the sensor of the autonomous vehicle associated with the intersection; and determining the visibility score based at least in part on the minimum observable distance and the distance visible to the sensor of the autonomous vehicle.

D: The system of any of paragraphs A-C, wherein at least one of controlling the autonomous vehicle to traverse the at least the portion of the first region or controlling the autonomous vehicle to traverse through the first region is based at least in part on evaluating a state machine.

E: A method comprising: determining that a vehicle is within a threshold distance of a maneuver position associated with a junction; determining a caution region associated with a maneuver, the maneuver to be performed by the vehicle to traverse the junction; determining a transition speed to traverse a first region of the junction, the transition speed based on a visibility distance and a location of the vehicle with respect to the caution region; and controlling the vehicle to traverse the first region at the transition speed based the visibility distance and the location of the vehicle with respect to the caution region of the junction into a second region of the junction.

F: The method of paragraph E, wherein the vehicle is a first vehicle, the method further comprising: determining that a second vehicle is located between the first vehicle and the maneuver position at the junction; controlling the first vehicle to stop at a position behind the second vehicle until a time associated with the second vehicle no longer being located between the first vehicle and the maneuver position; and controlling the first vehicle to approach the maneuver position.

G: The method of paragraph E or F, further comprising determining an estimated time to execute the maneuver to turn at the junction based at least in part on a length of an arc from the maneuver position to an intersection of the arc with a path of an intersecting lane of the junction.

H: The method of paragraph G, further comprising determining a minimum observable distance associated with traversing the first region of the junction, the minimum observable distance based at least in part on the estimated time to execute the maneuver and a speed limit associated with the intersecting lane of the junction.

I: The method of paragraph H, wherein the transition speed is based at least in part on the minimum observable distance.

J: The method of any of paragraphs G-I, wherein the first region of the junction comprises a predefined offset from a portion of the intersecting lane or a portion of the junction, and wherein the maneuver position is outside of the predefined offset.

K: The method of any of paragraphs E-J, wherein the vehicle is a first vehicle, the method further comprising: detecting a second vehicle approaching in an intersecting lane of the junction, the second vehicle having a right-of-way at the junction; and controlling the first vehicle to stop or slow down in the first region of the junction allowing the second vehicle to proceed along the intersecting lane.

L: The method of paragraph K, further comprising: determining that the second vehicle has exited the first region; and controlling the first vehicle to resume the transition speed in the first region following the second vehicle exiting the first region.

M: The method of any of paragraphs E-L, wherein the visibility distance corresponds to an amount of visibility to one or more sensors of the vehicle of an intersecting lane of the junction, and the transition speed increases based at least in part on the amount of visibility of the intersecting lane of the junction increasing as the vehicle traverses the first region of the junction.

N: A non-transitory computer-readable medium storing instructions that, when executed, cause one or more processors to perform operations comprising: controlling a vehicle to approach a junction; determining that the junction is controlled by a signal instructing the vehicle to stop; determining that the vehicle is within a threshold distance of a maneuver position associated with the junction; determining a caution region associated with a maneuver to be performed by the vehicle to traverse the junction; determining a visibility distance of a sensor of the vehicle, the visibility distance associated with the junction; determining a location of the vehicle with respect to the caution region; determining a transition speed to traverse a portion of the junction, the transition speed based at least in part on the visibility distance and the location of the vehicle with respect to the caution region; and controlling the vehicle to execute a right turn into a lane associated with the junction based at least in part on the transition speed.

O: The non-transitory computer-readable medium of paragraph N, the operations further comprising determining an estimated time to execute the maneuver to turn at the junction based at least in part on one or more of a length of an arc from the maneuver position to an intersection of the arc with the lane or a speed limit associated with the lane.

P: The non-transitory computer-readable medium of paragraph O, the operations further comprising determining a minimum observable distance associated with traversing the portion of the junction, the minimum observable distance based at least in part on the estimated time to execute the maneuver and the speed limit associated with the lane, wherein the transition speed is based at least in part on the minimum observable distance.

Q: The non-transitory computer-readable medium of paragraph O or P, wherein the portion of the junction comprises a predefined offset from at least one of a portion of the lane or a portion of the junction.

R: The non-transitory computer-readable medium of any of paragraphs N-Q, wherein the transition speed increases based on at least one of: the visibility distance increasing; or a distance associated with the location of the vehicle with respect to the caution region decreasing.

S: The non-transitory computer-readable medium of any of paragraphs N-R, the operations further comprising: determining that the vehicle has crossed a threshold distance of the caution region; and preventing the vehicle from slowing or stopping as the vehicle executes the right turn into the lane based at least in part on crossing the threshold distance of the caution region.

T: The non-transitory computer-readable medium of any of paragraphs N-S, wherein the visibility distance corresponds to an amount of visibility to the sensor of the vehicle of an intersecting lane of the junction into which the vehicle turns, and the transition speed increases based at least in part on the amount of visibility of the intersecting lane of the junction increasing as the vehicle traverses the portion of the junction with respect to a minimum observable distance.

While the example clauses described above are described with respect to one particular implementation, it should be understood that, in the context of this document, the content of the example clauses can also be implemented via a method, device, system, a computer-readable medium, and/or another implementation.

CONCLUSION

While one or more examples of the techniques described herein have been described, various alterations, additions, permutations and equivalents thereof are included within the scope of the techniques described herein.

In the description of examples, reference is made to the accompanying drawings that form a part hereof, which show by way of illustration specific examples of the claimed subject matter. It is to be understood that other examples can be used and that changes or alterations, such as structural changes, can be made. Such examples, changes or alterations are not necessarily departures from the scope with respect to the intended claimed subject matter. While the steps herein can be presented in a certain order, in some cases the ordering can be changed so that certain inputs are provided at different times or in a different order without changing the function of the systems and methods described. The disclosed procedures could also be executed in different orders. Additionally, various computations that are herein need not be performed in the order disclosed, and other examples using alternative orderings of the computations could be readily implemented. In addition to being reordered, the computations could also be decomposed into sub-computations with the same results.

What is claimed is:

1. A system comprising:
one or more processors; and
one or more computer-readable media storing instructions executable by the one or more processors, wherein the instructions, when executed, cause the system to perform operations comprising:
receiving first sensor data from a sensor on an autonomous vehicle;
determining, based at least in part on the first sensor data, that the autonomous vehicle is approaching an intersection controlled by a traffic control device;
determining, based at least in part on the first sensor data, that the traffic control device is instructing the autonomous vehicle to stop;
determining that the autonomous vehicle is within a threshold distance to a stop line associated with the intersection;
determining a first region associated with the intersection, the first region representing an offset from a path associated with a drivable area of the intersection;
controlling the autonomous vehicle to traverse at least a portion of the first region at a speed to capture second sensor data;
determining, based at least in part on the second sensor data, a visibility score; and
controlling, based at least in part on the visibility score, the autonomous vehicle to traverse through the first region into a second region adjacent the first region to turn right at the intersection into a lane based at least in part on the visibility score.

2. The system of claim 1, the operations further comprising:
determining a length of an arc from a location of the autonomous vehicle to an intersection of the arc with the drivable area;
wherein the speed is based at least in part on one or more of a position of the autonomous vehicle with respect to the first region, the length of the arc, or the visibility score.

3. The system of claim 1, further comprising:
determining a minimum observable distance associated with the intersection;
determining a distance visible to the sensor of the autonomous vehicle associated with the intersection; and
determining the visibility score based at least in part on the minimum observable distance and the distance visible to the sensor of the autonomous vehicle.

4. The system of claim 1, wherein at least one of controlling the autonomous vehicle to traverse the at least the portion of the first region or controlling the autonomous vehicle to traverse through the first region is based at least in part on evaluating a state machine.

5. A method comprising:
determining that a vehicle is within a threshold distance of a maneuver position associated with a junction;
determining a caution region associated with a maneuver, the maneuver to be performed by the vehicle to traverse the junction;
determining a transition speed to traverse a first region of the junction, the transition speed based on a visibility distance and a location of the vehicle with respect to the caution region; and
controlling the vehicle to traverse the first region at the transition speed based the visibility distance and the location of the vehicle with respect to the caution region of the junction into a second region of the junction.

6. The method of claim 5, wherein the vehicle is a first vehicle, the method further comprising:
determining that a second vehicle is located between the first vehicle and the maneuver position at the junction;
controlling the first vehicle to stop at a position behind the second vehicle until a time associated with the second vehicle no longer being located between the first vehicle and the maneuver position; and
controlling the first vehicle to approach the maneuver position.

7. The method of claim 5, further comprising determining an estimated time to execute the maneuver to turn at the junction based at least in part on a length of an arc from the maneuver position to an intersection of the arc with a path of an intersecting lane of the junction.

8. The method of claim 7, further comprising determining a minimum observable distance associated with traversing the first region of the junction, the minimum observable distance based at least in part on the estimated time to execute the maneuver and a speed limit associated with the intersecting lane of the junction.

9. The method of claim 8, wherein the transition speed is based at least in part on the minimum observable distance.

10. The method of claim 7, wherein the first region of the junction comprises a predefined offset from a portion of the intersecting lane or a portion of the junction, and wherein the maneuver position is outside of the predefined offset.

11. The method of claim 5, wherein the vehicle is a first vehicle, the method further comprising:
detecting a second vehicle approaching in an intersecting lane of the junction, the second vehicle having a right-of-way at the junction; and
controlling the first vehicle to stop or slow down in the first region of the junction allowing the second vehicle to proceed along the intersecting lane.

12. The method of claim 11, further comprising:
determining that the second vehicle has exited the first region; and controlling the first vehicle to resume the transition speed in the first region following the second vehicle exiting the first region.

13. The method of claim 5, wherein the visibility distance corresponds to an amount of visibility to one or more sensors of the vehicle of an intersecting lane of the junction, and
the transition speed increases based at least in part on the amount of visibility of the intersecting lane of the junction increasing as the vehicle traverses the first region of the junction.

14. A non-transitory computer-readable medium storing instructions that, when executed, cause one or more processors to perform operations comprising:
controlling a vehicle to approach a junction;
determining that the junction is controlled by a signal instructing the vehicle to stop;
determining that the vehicle is within a threshold distance of a maneuver position associated with the junction;
determining a caution region associated with a maneuver to be performed by the vehicle to traverse the junction;
determining a visibility distance of a sensor of the vehicle, the visibility distance associated with the junction;
determining a location of the vehicle with respect to the caution region;
determining a transition speed to traverse a portion of the junction, the transition speed based at least in part on the visibility distance and the location of the vehicle with respect to the caution region; and
controlling the vehicle to execute a right turn into a lane associated with the junction based at least in part on the transition speed.

15. The non-transitory computer-readable medium of claim 14, the operations further comprising determining an estimated time to execute the maneuver to turn at the junction based at least in part on one or more of a length of an arc from the maneuver position to an intersection of the arc with the lane or a speed limit associated with the lane.

16. The non-transitory computer-readable medium of claim 15, the operations further comprising determining a minimum observable distance associated with traversing the portion of the junction, the minimum observable distance based at least in part on the estimated time to execute the maneuver and the speed limit associated with the lane,
wherein the transition speed is based at least in part on the minimum observable distance.

17. The non-transitory computer-readable medium of claim 15, wherein the portion of the junction comprises a predefined offset from at least one of a portion of the lane or a portion of the junction.

18. The non-transitory computer-readable medium of claim 14, wherein the transition speed increases based on at least one of:
the visibility distance increasing; or
a distance associated with the location of the vehicle with respect to the caution region decreasing.

19. The non-transitory computer-readable medium of claim 14, the operations further comprising:
determining that the vehicle has crossed a threshold distance of the caution region; and
preventing the vehicle from slowing or stopping as the vehicle executes the right turn into the lane based at least in part on crossing the threshold distance of the caution region.

20. The non-transitory computer-readable medium of claim 14, wherein the visibility distance corresponds to an amount of visibility to the sensor of the vehicle of an intersecting lane of the junction into which the vehicle turns, and
the transition speed increases based at least in part on the amount of visibility of the intersecting lane of the junction increasing as the vehicle traverses the portion of the junction with respect to a minimum observable distance.

* * * * *